United States Patent
Daud et al.

(10) Patent No.: US 9,531,585 B2
(45) Date of Patent: *Dec. 27, 2016

(54) NETWORK BOOTSTRAPPING FOR A DISTRIBUTED STORAGE SYSTEM

(71) Applicant: Igneous Systems, Inc., Seattle, WA (US)

(72) Inventors: Asif Arif Daud, Seattle, WA (US); Andrew Martin Pilloud, Seattle, WA (US); Kevin Thomas Wallace, Seattle, WA (US)

(73) Assignee: Igneous Systems, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,773

(22) Filed: Feb. 29, 2016

(65) Prior Publication Data
US 2016/0277237 A1   Sep. 22, 2016

Related U.S. Application Data

(63) Continuation of application No. 14/663,359, filed on Mar. 19, 2015, now Pat. No. 9,276,900.

(51) Int. Cl.
*H04L 12/24* (2006.01)
*H04L 29/12* (2006.01)
(Continued)

(52) U.S. Cl.
CPC ........... *H04L 41/0803* (2013.01); *H04L 41/12* (2013.01); *H04L 61/1511* (2013.01);
(Continued)

(58) Field of Classification Search
CPC .. H04L 41/12; H04L 41/5058; H04L 61/1511; H04W 8/005
See application file for complete search history.

(56) References Cited

U.S. PATENT DOCUMENTS 6,567,826 B1   5/2003   Fischer et al.
6,615,314 B1   9/2003   Higaki et al.
(Continued)

FOREIGN PATENT DOCUMENTS

WO   2014004234 A1   1/2014

OTHER PUBLICATIONS

Office Communication for U.S. Appl. No. 14/454,651 mailed on Nov. 5, 2014 (7 pages).
(Continued)

*Primary Examiner* — Jeong S Park
(74) *Attorney, Agent, or Firm* — John W. Branch; Lowe Graham Jones PLLC

(57) ABSTRACT

Embodiments are directed towards configuring a distributed storage system over a network. Master computers and Subordinate computers may separate components of the distributed storage system. Each subordinate computer may perform actions when connected to the network. When the network provides for site-level multicasting, the subordinate computer broadcasts site-level multicast request(s) for a network address of master computer(s) assigned to that subordinate computer. When the network supports a local domain name system (DNS) server, the subordinate computer provides a DNS query to the local DNS server to obtain from an external server the network address for the master computer(s) assigned to that subordinate computer. When then network supports a master computer as a DNS server, the subordinate computer provides the DNS query to the master computer DNS server to obtain from the external server the network address of the master computer(s) assigned to that subordinate computer.

20 Claims, 11 Drawing Sheets

(51) Int. Cl.
*H04L 29/08* (2006.01)
*H04W 8/00* (2009.01)

(52) U.S. Cl.
CPC ...... *H04L 61/2023* (2013.01); *H04L 61/2069* (2013.01); *H04L 67/1097* (2013.01); *H04L 41/5058* (2013.01); *H04L 61/2007* (2013.01); *H04W 8/005* (2013.01)

(56) References Cited

U.S. PATENT DOCUMENTS

| | | | |
|---|---|---|---|
| 6,647,514 | B1 | 11/2003 | Umberger et al. |
| 7,020,587 | B1 | 3/2006 | Di et al. |
| 7,305,579 | B2 | 12/2007 | Williams |
| 7,451,344 | B1 | 11/2008 | Rothberg |
| 8,006,128 | B2 | 8/2011 | Olster |
| 8,140,914 | B2 | 3/2012 | Murphy et al. |
| 8,200,842 | B1 * | 6/2012 | Lau ............... H04L 43/0817 709/245 |
| 8,438,420 | B1 | 5/2013 | Dutch et al. |
| 8,452,819 | B1 | 5/2013 | Sorenson, III et al. |
| 8,751,739 | B1 | 6/2014 | Bjornsson |
| 8,751,861 | B2 | 6/2014 | Nair et al. |
| 8,850,108 | B1 | 9/2014 | Hayes et al. |
| 9,003,144 | B1 | 4/2015 | Hayes et al. |
| 9,075,773 | B1 | 7/2015 | Rakitzis et al. |
| 9,087,012 | B1 | 7/2015 | Hayes et al. |
| 9,276,900 | B1 * | 3/2016 | Daud ............... H04L 61/2069 |
| 2003/0007482 | A1 * | 1/2003 | Khello ............. H04L 29/1216 370/352 |
| 2006/0015771 | A1 | 1/2006 | Gundy et al. |
| 2006/0190683 | A1 | 8/2006 | Takase |
| 2007/0083723 | A1 | 4/2007 | Dey et al. |
| 2007/0220313 | A1 | 9/2007 | Katsuragi et al. |
| 2007/0276905 | A1 | 11/2007 | Durand et al. |
| 2008/0069100 | A1 | 3/2008 | Weyman et al. |
| 2008/0126844 | A1 | 5/2008 | Morita et al. |
| 2008/0199155 | A1 | 8/2008 | Hagens et al. |
| 2009/0106578 | A1 | 4/2009 | Dilman et al. |
| 2009/0172285 | A1 | 7/2009 | Smith et al. |
| 2010/0306409 | A1 * | 12/2010 | Jansen ............. H04L 29/12066 709/245 |
| 2010/0312875 | A1 * | 12/2010 | Wilerson ......... H04L 29/12066 709/224 |
| 2011/0029809 | A1 | 2/2011 | Dhuse et al. |
| 2011/0138124 | A1 | 6/2011 | Hill et al. |
| 2011/0282936 | A1 * | 11/2011 | Chekhanovskiy .. H04L 12/2809 709/203 |
| 2011/0289378 | A1 | 11/2011 | Grube et al. |
| 2012/0079317 | A1 | 3/2012 | Nelogal et al. |
| 2012/0215874 | A1 | 8/2012 | Sequeira et al. |
| 2012/0226871 | A1 | 9/2012 | Cantin et al. |
| 2012/0303736 | A1 | 11/2012 | Novotny et al. |
| 2012/0317254 | A1 * | 12/2012 | Chekhanovskiy .. H04L 61/1511 709/222 |
| 2013/0018978 | A1 | 1/2013 | Crowe et al. |
| 2013/0024723 | A1 | 1/2013 | Govindasamy |
| 2013/0054913 | A1 | 2/2013 | Maeda et al. |
| 2013/0073896 | A1 | 3/2013 | Le Scouarnec |
| 2013/0166816 | A1 | 6/2013 | Atkisson et al. |
| 2013/0275815 | A1 | 10/2013 | De Keyser et al. |
| 2013/0286579 | A1 | 10/2013 | De Spiegeleer et al. |
| 2013/0290775 | A1 | 10/2013 | Tucek et al. |
| 2014/0101283 | A1 | 4/2014 | Alnafoosi et al. |
| 2014/0337530 | A1 * | 11/2014 | Amishav ............. H04L 41/5058 709/226 |
| 2014/0365819 | A1 | 12/2014 | Cooper et al. |

OTHER PUBLICATIONS

Office Communication for U.S. Appl. No. 14/272,303 mailed on Dec. 22, 2014 (17 pages).
Office Communication for U.S. Appl. No. 14/550,466 mailed on Feb. 9, 2015 (9 pages).
Office Communication for U.S. Appl. No. 14/454,651 mailed on Apr. 24, 2015 (9 pages).
Office Communication for U.S. Appl. No. 14/272,303 mailed on May 7, 2015 (7 pages).
Office Communication for U.S. Appl. No. 14/663,359 mailed on May 18, 2015 (11 pages).
Office Communication for U.S. Appl. No. 14/550,466 mailed on Jun. 3, 2015 (5 pages).
International Search Report and Written Opinion for International Patent Application No. PCT/US2015/029215 mailed on Jul. 7, 2015 (9 pages).
International Search Report and Written Opinion for International Application No. PCT/US2015/031397 mailed on Aug. 4, 2015 (9 pages).
Office Communication for U.S. Appl. No. 14/792,539 mailed on Sep. 15, 2015 (8 pages).
Office Communication for U.S. Appl. No. 14/663,359 mailed on Oct. 7, 2015 (14 pages).
Office Communication for U.S. Appl. No. 14/315,139 mailed on Sep. 4, 2014 (16 pages).
Office Communication for U.S. Appl. No. 14/315,139 mailed on Dec. 26, 2014 (15 pages).
Office Communication for U.S. Appl. No. 14/315,139 mailed on May 7, 2015 (15 pages).
Office Communication for U.S. Appl. No. 14/315,139 mailed on Aug. 27, 2015 (11 pages).
Office Communication for U.S. Appl. No. 14/663,359 mailed on Jan. 15, 2016 (9 pages).
Office Communication for U.S. Appl. No. 14/954,616 mailed on Feb. 5, 2016 (19 pages).
Office Communication for U.S. Appl. No. 14/792,539 mailed on Feb. 8, 2016 (8 pages).
International Search Report and Written Opinion for Application PCT/US2016/017529 mailed on Jun. 13, 2016, 12 pages.

* cited by examiner

NETWORK BOOTSTRAPPING FOR A DISTRIBUTED STORAGE SYSTEM

CROSS-REFERENCE TO RELATED APPLICATION(S)

This Utility Patent Application is a Continuation of U.S. patent application Ser. No. 14/663,359 filed on Mar. 19, 2015, now U.S. Pat. No. 9,276,900 issued on Mar. 1, 2016, the benefit of which is claimed under 35 U.S.C. §120, and which is further incorporated by reference in its entirety.

TECHNICAL FIELD

The present invention relates generally to data storage, and more particular, but not exclusive, to configuring a distributed storage system within a customer network.

BACKGROUND

The use of distributed storage systems has grown in abundance over the past few years. Modern enterprises continue to increase the amount of data generated and retained for long periods of time. This explosion in data has led to larger and larger data storage systems. In some cases, these data storage systems may include thousands of storage devices. These storage devices may be distributed throughout an enterprise's network. Unfortunately, as the number of storage devices in a distributed storage system increases so does the time and resources used to configure and reconfigure the system as storage devices are added and/or removed from the system. Similarly, some networks may not support a fully automated configuration process, which can further increase the complexity and time consuming task of manually configuring a distributed storage system. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like components throughout the various figures unless otherwise specified.

For a better understanding of the present invention, reference will be made to the following Detailed Description, which is to be read in association with the accompanying drawings, wherein.

DETAILED DESCRIPTION

Figure 1:
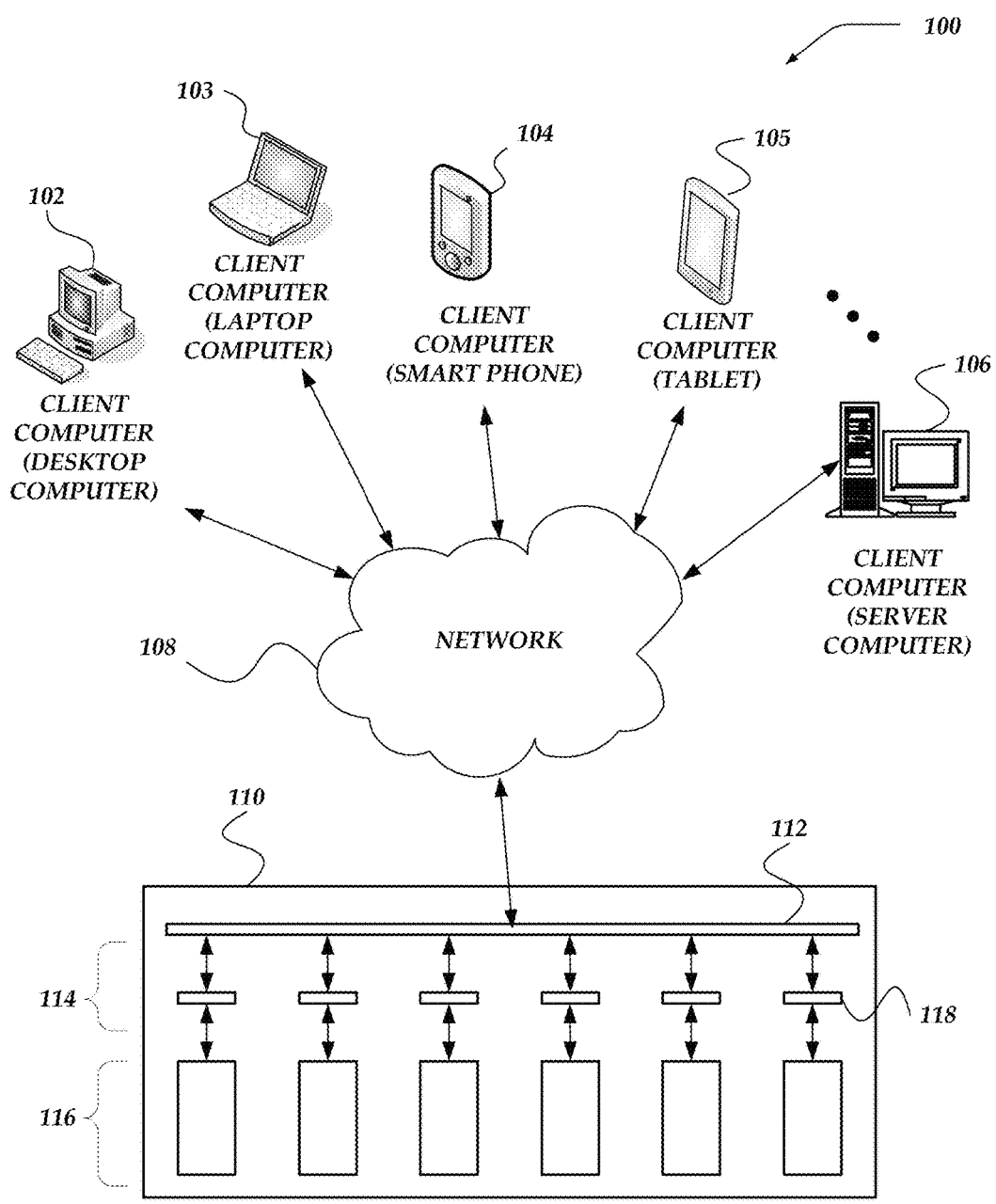
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the tem "storage device" refers to various apparatus for digitally storing information, generally for use by computers. Storage devices may be fixed or removable non-volatile memory systems, such as, for example, hard disk drives (e.g., magnetic hard drives), magnetic tape, optical drives, solid state drives (SSD), flash memory storage, or the like. Typically, one or more storage devices may be arranged to store information for use in a computer system. In some embodiments, a storage device may also be referred to as a storage drive.

As used herein, the term "distributed storage system" refers to a plurality of storage devices. The plurality of storage devices in a distributed storage system may be configured and arranged such that together they operate as a single storage system or as a single storage device. In various embodiments, the plurality of storage devices in a distributed storage system may be individually accessible (i.e., individually network addressable), such as through a controller connected to each separate storage drive. Storage devices in a distributed storage system may be in a same location (e.g., in a same chassis) or may be in different locations (e.g., in different chassis, in different geographical locations around the world, or the like). Similarly, storage devices in a distributed storage system may be connected to a customer network, but may be in one or more subnets or groups. In various embodiments, the storage devices in a distributed storage system may be configured to operate in one or more clusters of storage devices.

As used herein, the term "controller" or "controller computer" may refer to a computer or physical device that is separate from a typical/non-specific/general storage device (or storage drive) and separate from a multi-storage-device chassis, but can be electrically coupled between an individual storage device and the chassis backplane. In various embodiments, the controller may have dimensions that fit into the form factor shadow of the storage device so that it can fit into a typical multi-storage-device chassis.

In some embodiments, the controller may be configured to individually control and/or manage the storage device that it is connected to, such as controlling power supplied to the storage device. So, unlike a master computer that would control/manage a plurality of storage devices, each controller individually controls/manages its own corresponding individual storage device. Although, in various embodiments controllers may communicate with each other to coordinate and perform tasks between a plurality of storage devices, such as, but not limited to reads and/or writes. In some embodiments, controllers can communicate locally (without accessing the chassis interface for communication with external/remote devices) with other controllers through the Ethernet switch fabric interface of the chassis via Ethernet protocols.

It should be noted that these examples of controller functionality are for illustration purposes and should not be construed as limiting, and that each controller may perform additional tasks and/or actions at the individual storage device level and/or coordinate with each other to perform tasks and/or actions across a plurality of storage devices. For example, controllers may also determine power-up sequences for the storage devices and/or monitoring various performance characteristics of its corresponding storage device (e.g., power consumption, temperature, response time/latency, or the like) to provide comprehensive storage device analytics and diagnostics at the individual storage device level. This type of monitoring can allow a controller to identify that its corresponding storage device may be about to fail (e.g., changes in power consumption, temperatures above a threshold, increased latency, or the like), and coordinate with other controllers (or an administrator) to backup the potentially failing storage device's data, halt future write operations to potentially failing storage device, or the like—all while being able to control which storage devices are part of a group of storage devices, which storage devices are included in shingle, and which storage devices can be powered down.

In various embodiments, each controller may make each separate storage device individually network accessible by other controllers and/or network computers. For example, in various embodiments, the controller can accept data in a storage device supported protocol through a storage-device connector and convert it into an Ethernet supported protocol for output through the backplane connector and over the Ethernet switch fabric interface to other network computers (or controllers). Similarly, the controller can accept data in an Ethernet supported protocol through the backplane connector and convert it to a storage device supported protocol for output through the storage-device connector to the storage device.

As used herein, "master computer" and "subordinate computer" refer computing devices that operate together to perform various tasks associated with a distributed storage system. In various embodiments, master computers and subordinate computers may differ in their processing resources/capacity and/or functionality. For example, a master computer may coordinate a storage system task among a plurality of subordinate computers, while the subordinate computers perform the task. In some embodiments, a subordinate computer may be the combination of a storage device and a controller, such that each storage device is individually network addressable. In at least one of various embodiments, a master computer may be a controller or other computing device associated with one or more storage devices and/or chassis to manage the storage devices.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detail description this is presented later.

Briefly stated, embodiments are directed towards configuring a distributed storage system over a network. A plurality of master computers and a plurality of subordinate computers may be connected to the network. Each master computer subordinate computer is a separate component of the distributed storage system. Each subordinate computer may perform the following actions when connected to the network to determine one or more master computers assigned to that particular subordinate computer. When the network provides for site-level multicasting, the subordinate computer broadcasts site-level multicast request(s) for a network address of one or more master computers assigned to that subordinate computer. When the network supports a local domain name system (DNS) server, the subordinate computer provides a DNS query to the local DNS server to obtain from an external server the network address for the one or more master computers assigned to that subordinate computer. In various embodiments, the DNS query requests a list of network addresses for the one or more master computers of the subordinate computer without providing an identity of the one or more master computers. In various embodiments, each of the master computers may provide its network address to the external server to enable the external server to provide master computer network addresses to the subordinate computer based on the query.

And when then network supports a master computer as a DNS server, the subordinate computer provides the DNS query to the master computer DNS server to obtain from the external server the network address of the one or more master computers assigned to that subordinate computer. In various embodiments, a master computer may be configured as a DNS server to communicate DNS requests to the external server.

In some embodiments, the subordinate computer may provide a request to at least one of the one or more master computers to determine other subordinate computers associated with the subordinate computer. In other embodiments, a subordinate computer may provide a request to at least one of the one or more master computers to register with the one or more master computers.

Similar to subordinate computers, master computers may employ embodiments described herein to determine other master computers in a same cluster as that particular master computer. In various embodiments, each master computer may perform the following actions when connected to the network to determine one or more other master computers assigned to a same cluster as that particular master computer. When the network provides for site-level multicasting, the master computer broadcasts site-level multicast request(s) for a network address of one or more other master computers assigned to the same cluster as that that master computer. When the network supports a local domain name system (DNS) server, the master computer provides a DNS query to the local DNS server to obtain from an external server the network address for the one or more other master computers assigned to the same cluster as that master computer. And when then network supports a master computer as a DNS server, a newly connected master computer provides the DNS query to the master computer DNS server to obtain from the external server the network address of the one or more other master computers assigned to the same cluster as that newly connected master computer.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include multi-storage-device chassis 110, client computers 102-106, and network 108.

Client computers 102-106 may communicate with one or more multi-storage-device chassis 110 via network 108. Network 108 may be configured to couple network computers with other computing devices, including Client computers 102-106, multi-storage-device chassis 110, other networks, or the like. In various embodiments, information communicated between devices may include various kinds of information, including, but not limited to, processor-readable instructions, client requests, server responses, program modules, applications, raw data, control data, video data, voice data, image data, text data, or the like. In some embodiments, this information may be communicated between devices using one or more technologies and/or network protocols.

In some embodiments, network 108 may include various wired networks, wireless networks, or any combination thereof. In various embodiments, network 108 may be enabled to employ various forms of communication technology, topology, computer-readable media, or the like, for communicating information from one electronic device to another. For example, network 108 can include—in addition to the Internet—LANs, WANs, Personal Area Networks (PANs), Campus Area Networks (CANs), Metropolitan Area Networks (MANs), direct communication connections (such as through a USB port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, network computers and/or other related electronic devices could be connected to a network via a modem and temporary telephone link. In essence, the network may include any communication technology by which information may travel between computing devices.

Network 108 may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computers 103-105. Such sub-networks may include mesh networks, Wireless LAN (WLAN) networks, cellular networks, or the like. In at least one of the various embodiments, the system may include more than one wireless network.

Network 108 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MIMS), or any of a variety of other communication protocols and/or technologies. In essence, the network may include communication technologies by which information may travel between client computers 102-106, multi-storage-device 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

At least one embodiment of client computers 102-106 is described in more detail below in conjunction with client computer 300 of FIG. 3. Briefly, in some embodiments, client computers 102-106 may be configured to communicate with multi-storage-device chassis 110 to enable distributed storage. Generally, client computers 102-106 may include various types of client and/or server computers. In some embodiments, client computers 102-106 may communicate with individual controllers (e.g., controllers 114) for each storage device associated with multi-storage-device chassis 110 (e.g., storage devices 116) to perform reads and writes of data, access information and/or analytics, or the like. In various embodiments, client computers 102-106 may be remote and/or separate from chassis 110 and controllers 114. In other embodiments, client computers 102-106 may communicate directly with storage devices 116 or with a master computer that can coordinate data reads and writes among storage devices 116.

In some embodiments, at least some of client computers 102-106 may operate over a wired and/or wireless network (e.g., network 108) to communicate with other computing devices and/or multi-storage-device chassis 110. Generally, client computers 102-106 may include computing devices capable of communicating over a network to send and/or receive information, perform various online and/or offline activities, or the like. It should be recognized that embodiments described herein are not constrained by the number or type of network computers employed, and more or fewer network computers—and/or types of network computers—than what is illustrated in FIG. 1 may be employed.

Devices that may operate as client computers 102-106 may include various computing devices that typically connect to a network or other computing device using a wired and/or wireless communications medium. Client computers may include portable and/or non-portable computers. Examples of client computers 102-106 may include, but are not limited to, desktop computers (e.g., client computer 102), server computers (e.g., client computer 106), personal computers, multiprocessor systems, microprocessor-based or programmable electronic devices, network PCs, laptop computers (e.g., client computer 103), smart phones (e.g., client computer 104), tablet computers (e.g., client computer 105), cellular telephones, display pagers, radio frequency (RF) devices, infrared (IR) devices, Personal Digital Assistants (PDAs), handheld computers, wearable computing devices, entertainment/home media systems (e.g., televisions, gaming consoles, audio equipment, or the like), household devices (e.g., thermostats, refrigerators, home security systems, or the like), multimedia navigation systems, automotive communications and entertainment systems, integrated devices combining functionality of one or more of the preceding devices, or the like. As such, client computers 102-106 may include computers with a wide range of capabilities and features. In some embodiments, client computers 102-106 may be referred to as remote computers, because they access and/or store data on a different computer/device, such as multi-storage-device chassis 110.

In some embodiments, multi-storage-device chassis 110 may be maintained at a location that is separate from client devices 102-106 (e.g., cloud computing/storage that utilize distributed storage systems). But in other embodiments, multi-storage-device chassis 110 may be incorporated in one or more of client computers 102-106.

Client computers 102-106 may access and/or employ various computing applications to enable users of network computers to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, client computers 102-106 may be enabled to connect to a network through a browser, or other web-based application.

Client computers 102-106 may further be configured to provide information that identifies the network computer. Such identifying information may include, but is not limited to, a type, capability, configuration, name, or the like, of the network computer. In at least one embodiment, a network computer may uniquely identify itself through any of a variety of mechanisms, such as an Internet Protocol (IP) address, phone number, Mobile Identification Number (MIN), media access control (MAC) address, electronic serial number (ESN), or other device identifier.

In various embodiments, a distributed storage system may include a plurality of storage devices. For example, as illustrated in FIG. 1, the distributed storage system may include a plurality of storage devices in one or more multi-storage-device chassis (e.g., multi-storage-device chassis 110), a plurality of standalone storage devices, or the like, or any combination thereof. As described herein, one or more master computers and one or more subordinate computers may operate together to perform the operations of the distributed storage system.

Multi-storage-device chassis 110 may include backplane 112 and may be configured to house a plurality of separate storage devices, such as storage devices 116, which may include more or less devices than what is illustrated in the figure. In some embodiments, each storage device may utilize (e.g., be fastened to) a storage carrier or tray (not shown) for insertion into the chassis. However, in some embodiments, the storage devices may be affixed directly to the chassis. As described herein, a separate controller (e.g., controllers 114) may be coupled to each separate storage device and the combination of the storage device and controller may be coupled to backplane 112. Each of controllers 114 may provide a separately addressable network interface for each of storage devices 116.

In various embodiments, chassis 110 may be configured and/or modified to provide Ethernet access to backplane 112. In at least one embodiment, backplane 112 may provide Ethernet access to each of controllers 114 through an Ethernet switch fabric interface that serially connects backplane connectors. In some embodiments, chassis 110 may include an Ethernet port and/or interface component for connecting chassis 110 to network 108.

Controllers 114 may communicate with client computers 102-106. In various embodiments, each of controllers 114 may convert data received from its corresponding storage device 116 into an Ethernet protocol and communicated to network computers 102-106 via backplane 112 and network 108. Similarly, each controller may convert data received from client computers 102-106 (via network 108 and the Ethernet connection supported by backplane 112) into a storage device protocol for accessing its own corresponding storage device.

In various embodiments, controllers 114 may coordinate which of storage devices 116 are included in a shingle, which storage devices are added or removed from a shingle, which storage devices may be powered up or down, or the like.

Since storage devices 116 can be of any typical/non-specific/general storage device/agnostic, each of controllers 114 may perform different types of data protocol conversions depending on the type storage device that it is coupled with. In this way, each storage device can be individually addressable and network computers 102-106 can individually access each separate storage device 116 via an Ethernet protocol without having to utilize a centralized/master controller—either a chassis controller or a standalone computer that centrally manages access to each storage device 116. So, in various embodiment, each separate controller (of controllers 114), and thus each separate storage device, is individually addressable and can be individually accessed by network devices 102-106. Generally, storage devices 116 may be referred to as a storage system.

In various embodiments, controllers 114 may communicate with each other via the Ethernet connection of backplane 112 to employ various storage device management actions, monitoring actions, or the like. So in some embodiments, controllers 114 may communicate with each other—independent of a chassis controller or other primary/main/master/coordinator computer—to perform various actions (some of which may be done in parallel), including, but not limited to, data reads, data writes, data recovery, or the like.

For example, in some embodiments, the controllers may communicate with each other to perform distributed data storage actions and tasks among a plurality of storage devices. In one non-limiting example, client computer 102 may provide a write request to controller 118 (in some embodiments, this request may go through a load balancer or other routing device). Controller 118 may work together with the separate controllers 114 to coordinate the write request across one or more of storage devices 116 (even if the network computer is unaware of the other controllers and/or storage devices). In this example, controller 118 may coordinate with the other controllers of controllers 114 to determine which controller/storage devices will store what data. Since each controller 114 is network accessible (e.g., IP addressable), in some embodiments, client computer 102 may be able to individually access each storage device 116 and indicate which storage devices will store what data.

It should be noted that in some embodiments a single controller may be identified as a master computer for controlling/managing data reads, writes, and/or other distributed storage system tasks. In other embodiments, another network computer (e.g., a server computer) can be a master computer to perform this distributed storage system management.

In some embodiments, controllers 114 may cooperatively coordinate with each other in a peer-to-peer architecture to control/manage operations of each correspondingly coupled storage device 116, as described herein. In other embodiments, controllers 114 may cooperatively coordinate storage-device-operation control/management with each other as more of a server-to-peer architecture, where one or more of controllers 114 may operate as master controllers (or master computers) and one or more of the other controllers of controllers 114 may operate as slave controllers (or subordinate computers).

In various other embodiments, one or more network computer and controllers 114 may operate in a server-to-peer architecture to control/manage operations of one or more storage devices 116 in chassis 110 (or storage devices in multiple chassis)—similar to that which is described above. In at least one such embodiment, the network computers may operate as master network computers (or master computers) and controllers 114 may operate as slave controllers (or subordinate computers). In various embodiments, the network computer (e.g., a master computer) may coordinate and/or instruct each of controllers 114 (e.g., subordinate computers) to control/manage operations of each correspondingly coupled storage device 116.

It should be noted that these architectures are not to be construed as exhaustive or limiting, but rather, other architectures may be employed in accordance with embodiments described herein. For example, in various embodiments, client computers 102-106 and/or controllers 114 may operate in various different architectures including, but not limited to, a peer-to-peer architecture, peer-to-server architecture, server-to-server architecture, or the like, to control/manage the operations of one or more of storage devices 116.

Illustrative Network Computer

Figure 2:
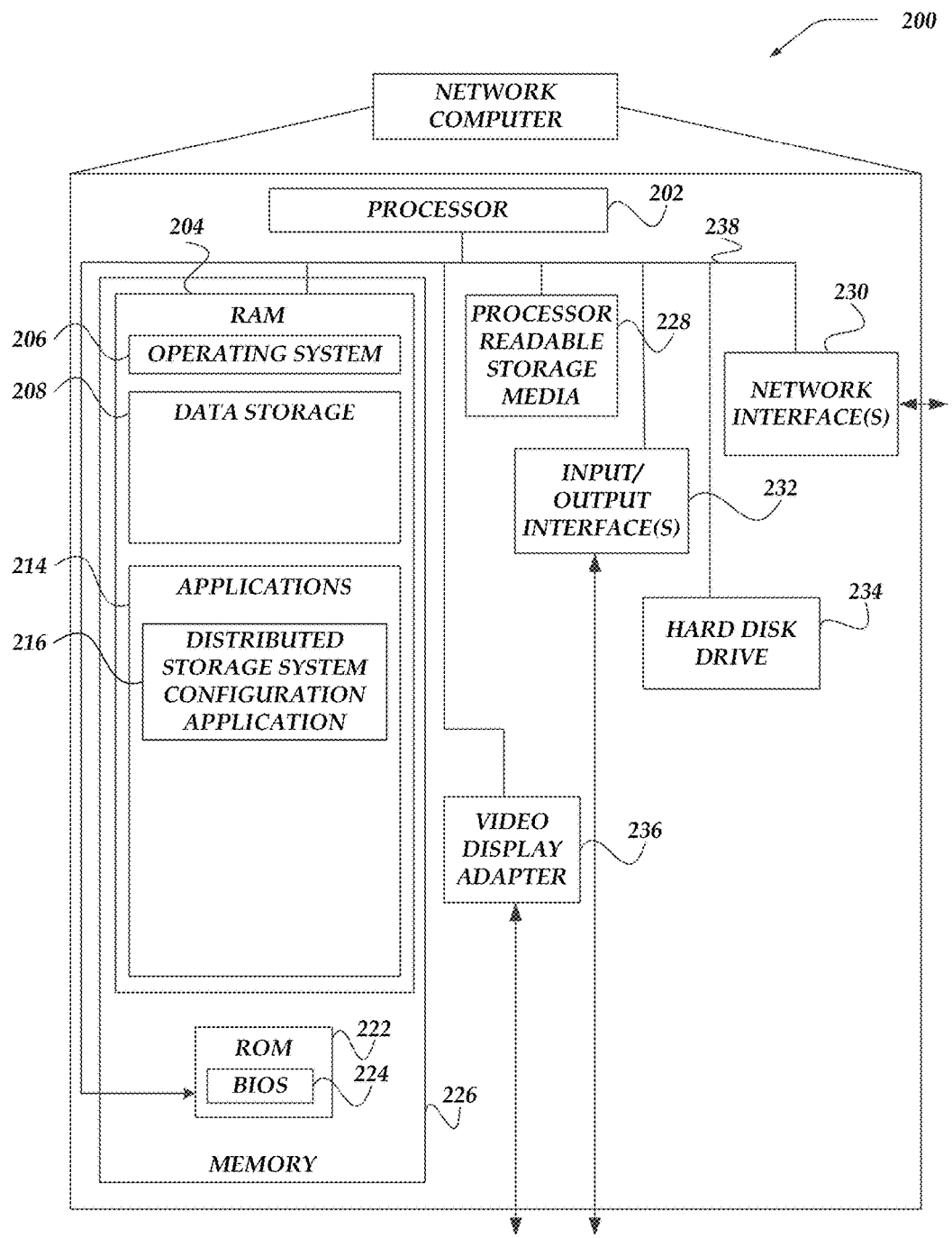
FIG. 2 shows an embodiment of a network computer that may be included in a system such as that shown in FIG. 1.

FIG. 2 shows one embodiment of a network computer 200 that may include many more or less components than those shown. The components shown, however, are sufficient to disclose an illustrative embodiment for practicing the invention. Network computer 200 may represent, for example controllers 114 of FIG. 1, and/or other network devices (e.g., master computers and/or subordinate computers).

Network computer 200 may be configured to operate as a server, client, peer, a host, or other computing device. In general, network computer 200 may be a desktop computer, mobile computer (e.g., laptop computers, smart phones, tablets, or the like), server computer, or any other network computer that can communicate through a network to access and/or store data at a storage system, such as a remote/secondary location (i.e., multi-storage-device chassis 110 of FIG. 1).

Network computer 200 may include processor 202, processor readable storage media 228, network interface 230, an input/output interface 232, hard disk drive 234, video display adapter 236, and memory 226, all in communication with each other via bus 238. In some embodiments, processor 202 may include one or more central processing units.

Network interface 230 includes circuitry for coupling network computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, EDGE, W-CDMA, LTE, UMTS, OFDM, CDMA2000, EV-DO, HSDPA, or any of a variety of other wireless communication protocols. Network interface 230 is sometimes known as a transceiver, transceiving device, or network interface card (NIC). In various embodiments, network interface unit 230 may enable network computer 200 to access and/or store data on one or more storage devices associated with a multi-storage-device chassis, such as multi-storage-device chassis 110 of FIG. 1.

Network computer 200 may comprise input/output interface 232 for communicating with external devices, such as a keyboard, or other input or output devices not shown in FIG. 2A. Input/output interface 232 can utilize one or more communication technologies, such as Universal Serial Bus (USB), infrared, WiFi, WiMax, Bluetooth™, wired technologies, or the like.

Memory 226 may include various types of storage technologies, which may include various types of non-volatile storage, volatile storage, or a combination thereof. Examples of memory 226 may include, but are not limited to Random Access Memory (RAM) (e.g., RAM 204), dynamic RAM (DRAM), static RAM (SRAM), Read-only Memory (ROM) (e.g., ROM 222), Electrically Erasable Programmable Read-only Memory (EEPROM), flash memory, hard disk drives, optical drives, magnetic computer storage devices, tape drives, floppy disk drives, or other processor-readable storage media. In some embodiments, memory 226 may include processor-readable transitory or non-transitory storage media. In various embodiments, memory 226 may include one or more caches.

Memory 226 may be utilized to store information, such as, but not limited to, processor-readable instructions (also referred to as computer-readable instructions), structured and/or unstructured data, program modules, or other data/information. In various embodiments, some of the data/information stored by memory 226 may be used by processor 202 to execute and/or perform actions. In some embodiments, at least some of the data/information stored by memory 226 may also be stored on another component of network computer 200, such as, but not limited to, processor-readable storage media 228. Processor-readable storage media 228 may include one or more storage technologies, such as, but not limited to, those storage technologies described above for memory 226. In various embodiments, processor-readable storage media 228 may also be referred to as computer-readable storage media, processor-readable storage devices, and/or computer-readable storage devices. In some embodiments, process-readable storage media 228 may be removable or non-removable from network computer 200.

Memory 226 may include system firmware, such as BIOS 224, which may store instructions for controlling low-level operations of network computer 200. Memory 226 may also store operating system 206 for controlling the operation of network computer 200. In some embodiments, operating system 206 may include a general purpose operating system (e.g., UNIX, LINUX™, Windows™, OSX™, Windows Phone™, iOS™, Android™, or the like). The operating system functionality may be extended by one or more libraries, modules, plug-ins, or the like.

Memory 226 may include one or more data storage 208, which can be utilized by network computer 200 to store, among other things, applications 214 and/or other data. For example, data storage 208 may also be employed to store information that describes various capabilities of network computer 200. The information may then be provided to another device based on any of a variety of events, including being sent as part of a header during a communication, sent upon request, or the like. Data storage 208 may also include a database, text, spreadsheet, folder, file, or the like, that may be configured to maintain and store user account identifiers, user profiles, email addresses, IM addresses, and/or other network addresses; or the like. Data storage 208 may further include program code, data, algorithms, and the like, for use by a processor, such as processor 202 to execute and perform actions. In one embodiment, at least some of data store 208 might also be stored on another component of network computer 200, including, but not limited to processor-readable storage media 228, hard disk drive 234, or the like.

Applications 214 may include computer executable instructions that, when executed by network computer 200, transmit, receive, and/or otherwise process instructions and data. In various embodiments, these applications may monitor or otherwise manage data transfers and tasks associated with a distributed storage system.

Applications 214 may also include an application that can enable a user to individually access each separate controller (e.g., controllers 114 of FIG. 1) associated with each storage device (e.g., storage devices 116 of FIG. 1) through a network. So, in some embodiments, each controller (i.e., each storage device) may be individually network addressable by network computer 200. This access can enable a user to employ control (e.g., power/voltage changes, temperature and other storage device performance monitoring, or the like) over each individual storage devices within a multi-storage-device chassis.

In various embodiments, applications 214 may include distributed storage system configuration application 216. Distributed storage system configuration application 216 may manage and/or otherwise perform at least a portion of the operations described herein to determine master computers and to configure the distributed storage system.

Illustrative Client Computer

Figure 3:
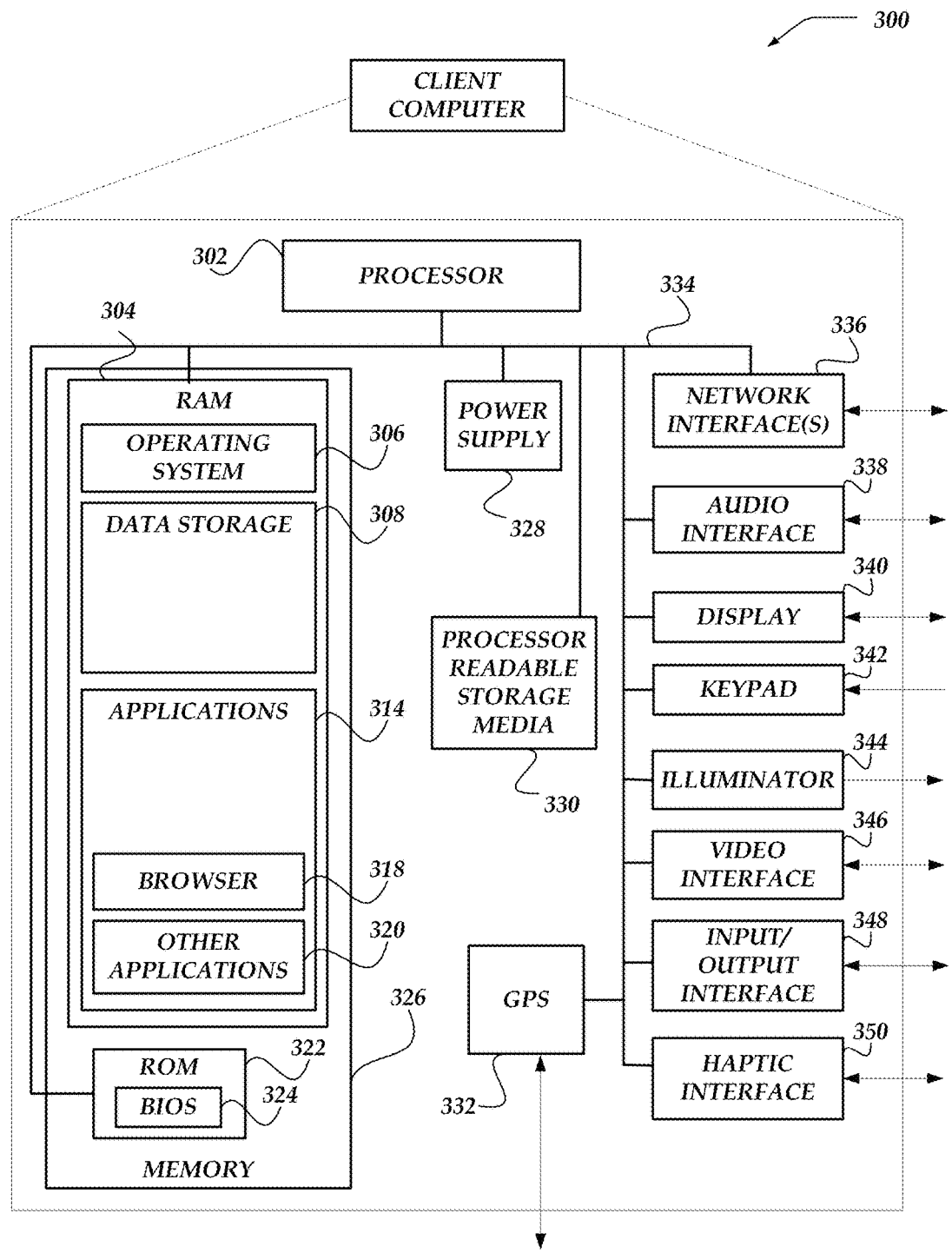
FIG. 3 shows one embodiment of a client computer that may be included in a system such as that shown in FIG. 1.

FIG. 3 shows one embodiment of client computer 300 that may be included in a system in accordance with at least one of the various embodiments. Client computer 300 may include many more or less components than those shown in FIG. 3. However, the components shown are sufficient to disclose an illustrative embodiment for practicing the present invention. Client computer 300 may represent, for example, one embodiment of at least one of client computers 102-106 of FIG. 1.

As shown in the figure, client computer 300 includes a processor 302 in communication with a mass memory 326 via a bus 334. In some embodiments, processor 302 may include one or more central processing units (CPU). Client computer 300 also includes a power supply 328, one or more network interfaces 336, an audio interface 338, a display 340, a keypad 342, an illuminator 344, a video interface 346, an input/output interface 348, a haptic interface 350, and a global positioning system (GPS) receiver 332.

Power supply 328 provides power to client computer 300. A rechargeable or non-rechargeable battery may be used to provide power. The power may also be provided by an external power source, such as an alternating current (AC) adapter or a powered docking cradle that supplements and/or recharges a battery.

Client computer 300 may optionally communicate with a base station (not shown), or directly with another computer. Network interface 336 includes circuitry for coupling client computer 300 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 336 is sometimes known as a transceiver, transceiving device, or network interface card (MC).

Audio interface 338 is arranged to produce and receive audio signals such as the sound of a human voice. For example, audio interface 338 may be coupled to a speaker and microphone (not shown) to enable telecommunication with others and/or generate an audio acknowledgement for some action.

Display 340 may be a liquid crystal display (LCD), gas plasma, light emitting diode (LED), organic LED, or any other type of display used with a computer. Display 340 may also include a touch sensitive screen arranged to receive input from an object such as a stylus or a digit from a human hand.

Keypad 342 may comprise any input device arranged to receive input from a user. For example, keypad 342 may include a push button numeric dial, or a keyboard. Keypad 342 may also include command buttons that are associated with selecting and sending images.

Illuminator 344 may provide a status indication and/or provide light. Illuminator 344 may remain active for specific periods of time or in response to events. For example, when illuminator 344 is active, it may backlight the buttons on keypad 342 and stay on while the client computer is powered. Also, illuminator 344 may backlight these buttons in various patterns when particular actions are performed, such as dialing another client computer. Illuminator 344 may also cause light sources positioned within a transparent or translucent case of the client computer to illuminate in response to actions.

Video interface 346 is arranged to capture video images, such as a still photo, a video segment, an infrared video, or the like. For example, video interface 346 may be coupled to a digital video camera, a web-camera, or the like. Video interface 346 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 300 also comprises input/output interface 348 for communicating with external devices, such as a headset, or other input or output devices not shown in FIG. 3. Input/output interface 348 can utilize one or more communication technologies, such as USB, infrared, Bluetooth™, or the like.

Haptic interface 350 is arranged to provide tactile feedback to a user of the client computer. For example, the haptic interface 350 may be employed to vibrate client computer 300 in a particular way when another user of a computer is calling. In some embodiments, haptic interface 350 may be optional.

Client computer 300 may also include GPS transceiver 332 to determine the physical coordinates of client computer 300 on the surface of the Earth. GPS transceiver 332, in some embodiments, may be optional. GPS transceiver 332 typically outputs a location as latitude and longitude values. However, GPS transceiver 332 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 300 on the surface of the Earth. It is understood that under different conditions, GPS transceiver 332 can determine a physical location within millimeters for client computer 300; and in other cases, the determined physical location may be less precise, such as within a meter or significantly greater distances. In one embodiment, however, client computer 300 may through other components, provide other information that may be employed to determine a physical location of the computer, including for example, a Media Access Control (MAC) address, IP address, or the like.

Mass memory 326 includes a Random Access Memory (RAM) 304, a Read-only Memory (ROM) 322, and other storage means. Mass memory 326 illustrates an example of computer readable storage media (devices) for storage of information such as computer readable instructions, data structures, program modules or other data. Mass memory 326 stores a basic input/output system (BIOS) 324, or the like, for controlling low-level operation of client computer 300. The mass memory also stores an operating system 306 for controlling the operation of client computer 300. It will be appreciated that this component may include a general-purpose operating system such as a version of UNIX, or LINUX™, or a specialized client communication operating system such as Microsoft Corporation's Windows Mobile™ Apple Corporation's iOS™, Google Corporation's Android™, or the like. The operating system may include, or interface with a Java virtual machine module that enables control of hardware components and/or operating system operations via Java application programs.

Mass memory 326 further includes one or more data storage 308, which can be utilized by client computer 300 to store, among other things, applications 314 and/or other data. For example, data storage 308 may also be employed to store information that describes various capabilities of client computer 300. The information may then be provided to another computer based on any of a variety of events, including being sent as part of a header during a communication, sent upon request, or the like. Data storage 308 may also be employed to store social networking information including address books, buddy lists, aliases, user profile information, user credentials, or the like. Further, data storage 308 may also store messages, web page content, or any of a variety of user generated content.

At least a portion of the information stored in data storage 308 may also be stored on another component of client computer 300, including, but not limited to processor readable storage media 330, a disk drive or other computer readable storage devices (not shown) within client computer 300.

Processor readable storage media 330 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 330 may also be referred to herein as computer readable storage media and/or computer readable storage device.

Applications 314 may include computer executable instructions which, when executed by client computer 300, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 314 may include, for example, a browser 318, and other applications 320.

Browser 318 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 318 may enable a user of client computer 300 to communicate with another network computer, such as storage management server computer 116, storage computer 118, and/or storage computer 120 as shown in FIG. 1.

Other applications 320 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Multi-Storage-Device Chassis

Figure 4:
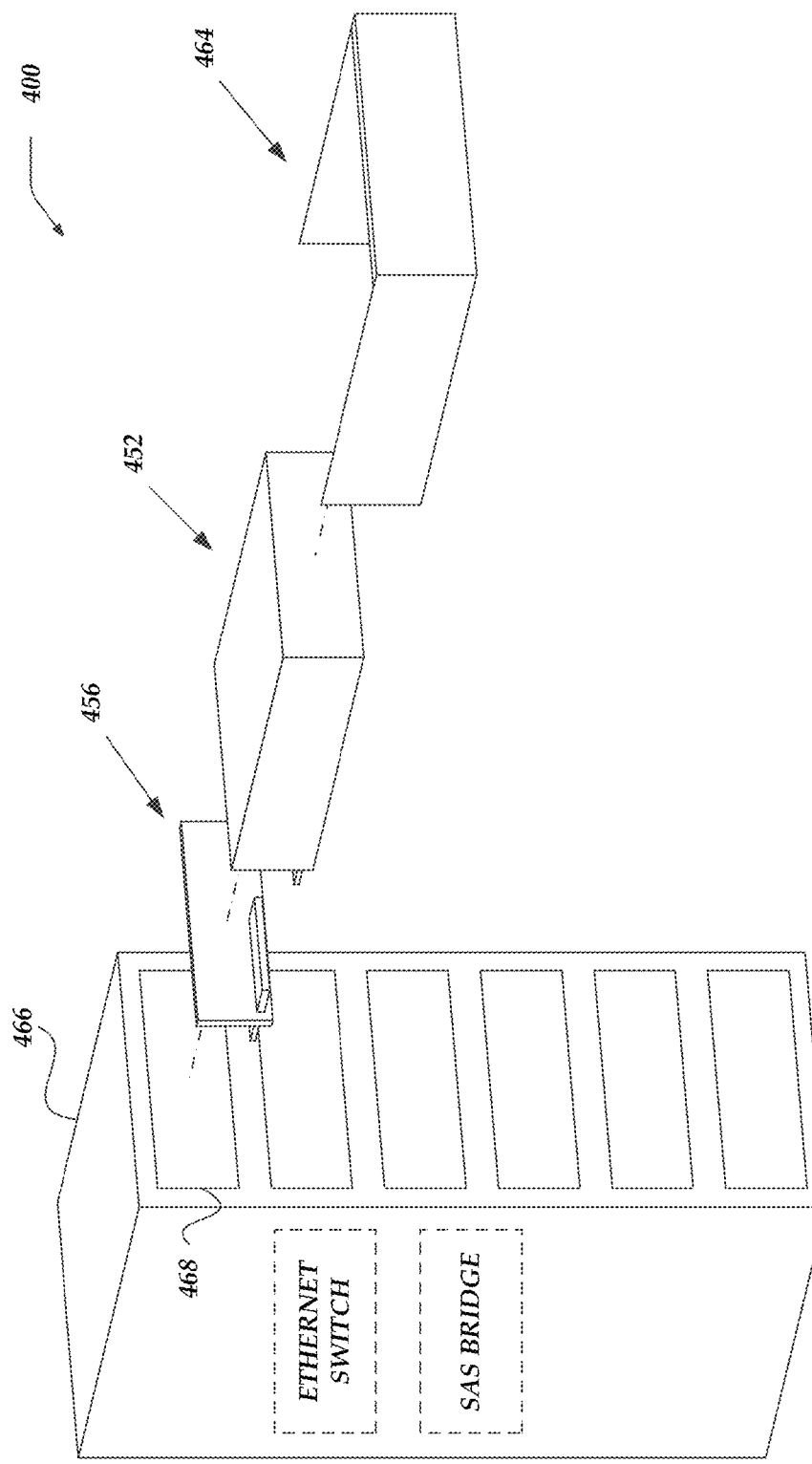
FIG. 4 shows an embodiment of an exploded perspective view of a multi-storage-device chassis that may be included in a system such as that shown in FIG. 1.

FIG. 4 shows an embodiment of an exploded perspective view of a multi-storage-device chassis that may be included in a system such as that shown in FIG. 1. System 400 may include multi-storage-device chassis 466 and storage-device carrier 464. In various embodiments, multi-storage-device chassis 466 may be an embodiment of multi-storage-device chassis 110 of FIG. 1. Multi-storage-device chassis 466 may be an example of a JBOD or other chassis that can support a plurality of storage drives. In some embodiments, storage-device carrier 464 may be configured and arranged to provide proper alignment of storage device 452 with a backplane of multi-storage-device chassis 466.

In various embodiments, controller 456 may be embodiment of controller 114 of FIG. 1, which may be subordinate computers and/or master computers to perform operations associated with a distributed storage system. Controller 456 may be coupled to a back of storage device 452. This combination of devices may be fastened to storage-device carrier 464. The combined carrier 464, device 452, and controller 456 may be inserted into slot 468 of chassis 466 in accordance with use instructions of chassis 466 for inserting a carrier into slot 468. As described herein, controller 456 may enable a remote network computer to individually access its correspondingly connected storage device 452. Similarly, controller 456 may communicate with other controllers to coordinate reads and/or writes of data among a plurality of storage devices. In at least one of various embodiments, controller 456 may be enabled to control power provided to storage device 452 such that storage device 452 can be powered down when removed or not in a shingle, powered up when added to a shingle, powered up to fulfill a read request and power down after completion of the read request, or the like.

In various embodiments, multi-storage-device chassis 466 may include an Ethernet switch and a storage-drive-data bridge (e.g., a SAS bridge). In various embodiments, the Ethernet switch may provide access between controllers and/or from the chassis to other networks, and the storage-drive-data bridge may provide direct data access to a network computer without utilizing the Ethernet switch.

Distributed Storage Device Bootstrapping Overview

As described herein, a distributed storage system may include a plurality of computers, which may include master computers and client computers. Master computers and subordinate computers can communicate with each other to enable the operation, execution, and performance of the distributed storage system. So, master computers and subordinate computers may communicate together to perform reads, writes, and other actions and tasks associated with a distributed storage system.

In various embodiments, the master computers and subordinate computers may be configured and arranged to operate in one or more clusters. Each cluster may include one or more master computers and one or more subordinate computers. Each cluster may be enabled to perform similar or different tasks associated with a distributed storage system.

Subordinate computers and/or master computers may be added or removed from a distributed storage system for a variety of reasons. For example, computers can fail, become disconnected, turn off, taken offline (e.g., for maintenance), or otherwise be removed from the system. Also, computers can be added to the system, rebooted, reestablish connectivity, or otherwise be added to the system. As subordinate computers are added to the system, they may have to determine which cluster they are a member of. In determining its cluster, a subordinate computer may have to determine which master computers of master computers 504 are its corresponding master computers. In some embodiments, a subordinate computer may also have to determine which other subordinate computers are in the same cluster as that particular subordinate computer. Similarly, as master computers are added to the system, they may have to determine which other master computers are in the same cluster, and which subordinate computers are in that cluster. It should be recognized that determining a master computer of a subordinate computer may include providing the subordinate computer with the network address of each master computer associated with that subordinate computer.

Figure 5:
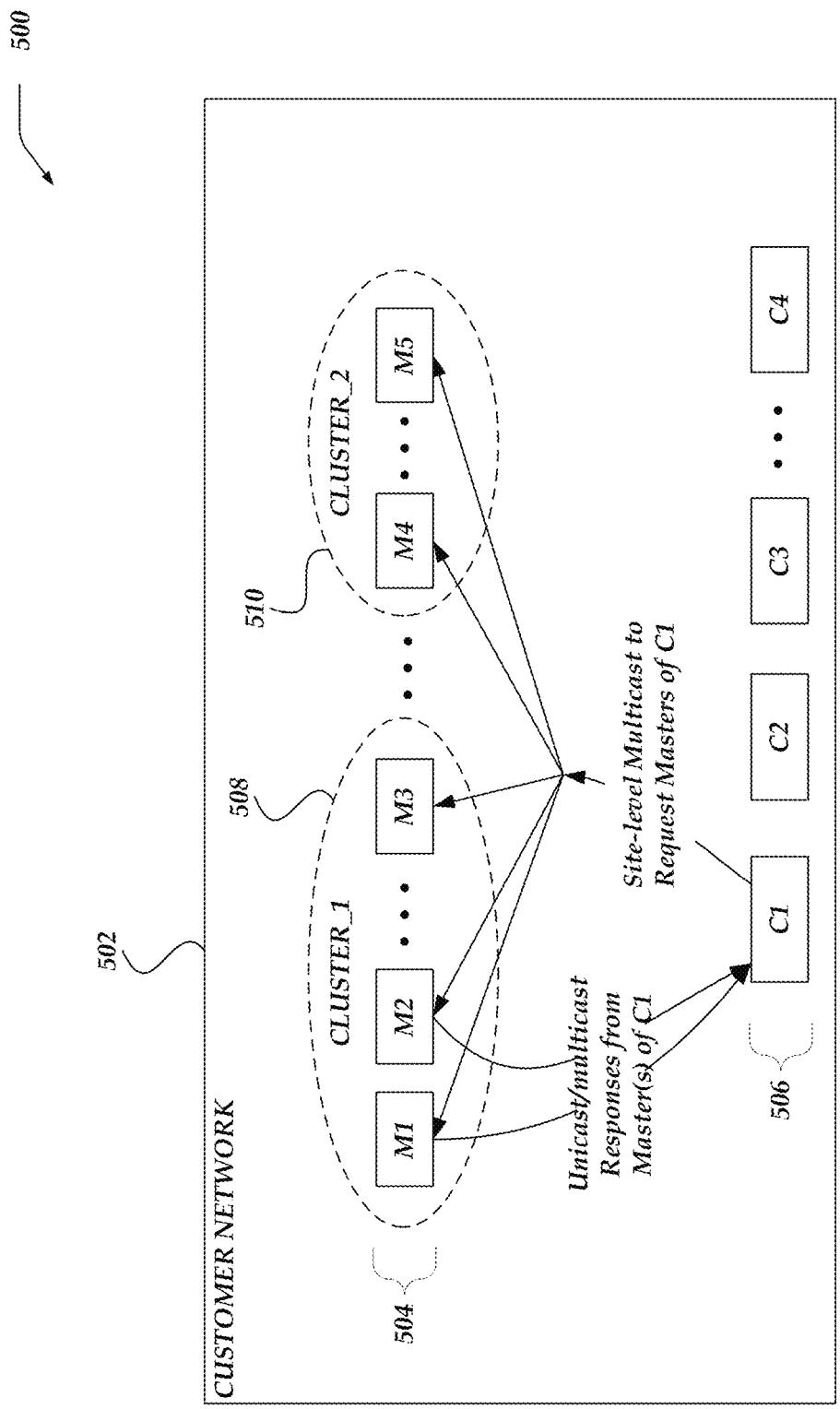
FIG. 5 shows an illustrative embodiment of a system for configuring a distributed storage system over a customer network when the customer network supports site-level multicast.
Figure 6:
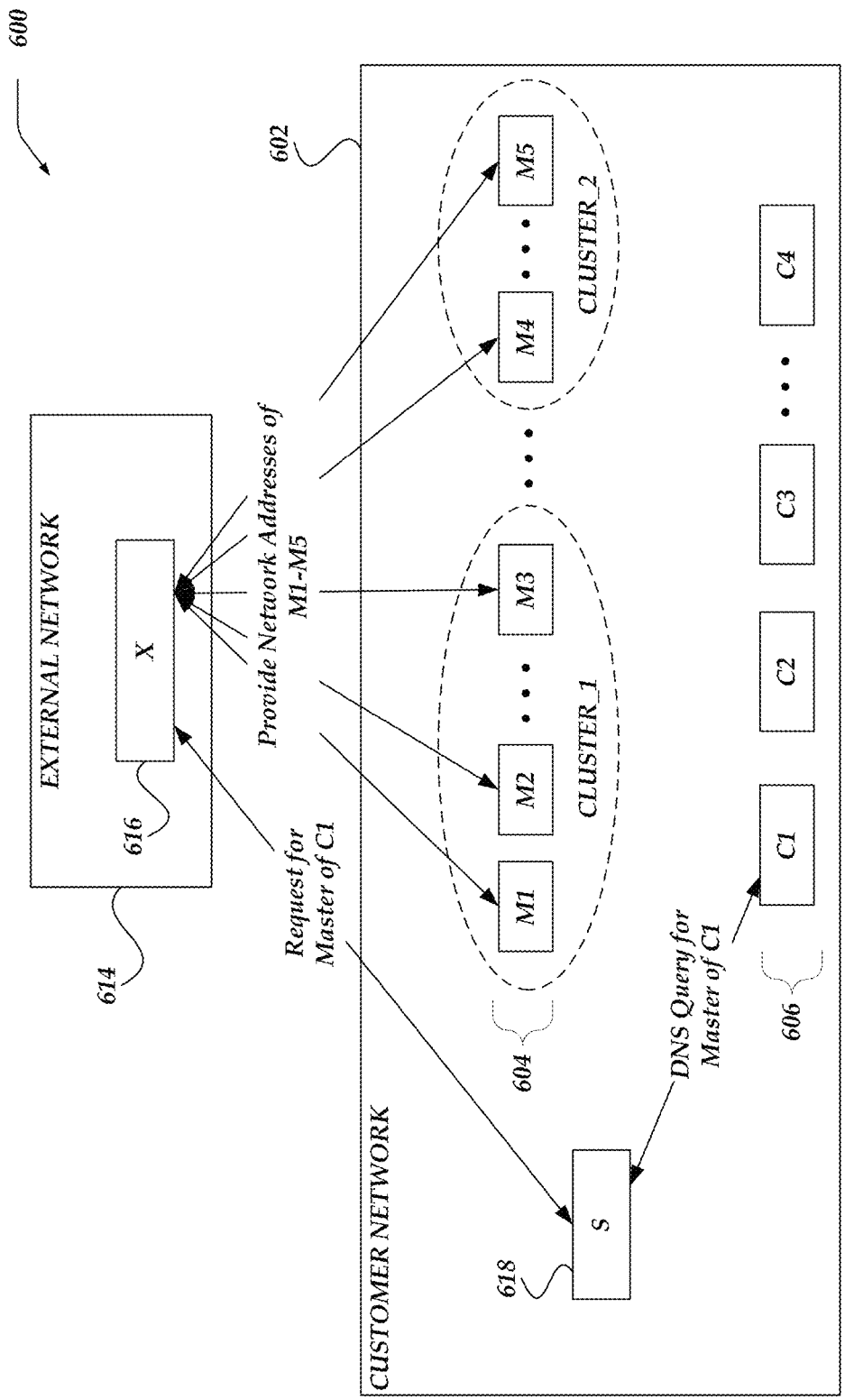
FIG. 6 shows an illustrative embodiment of a system for configuring a distributed storage system over a customer network when the customer network supports a local customer DNS server.
Figure 7:
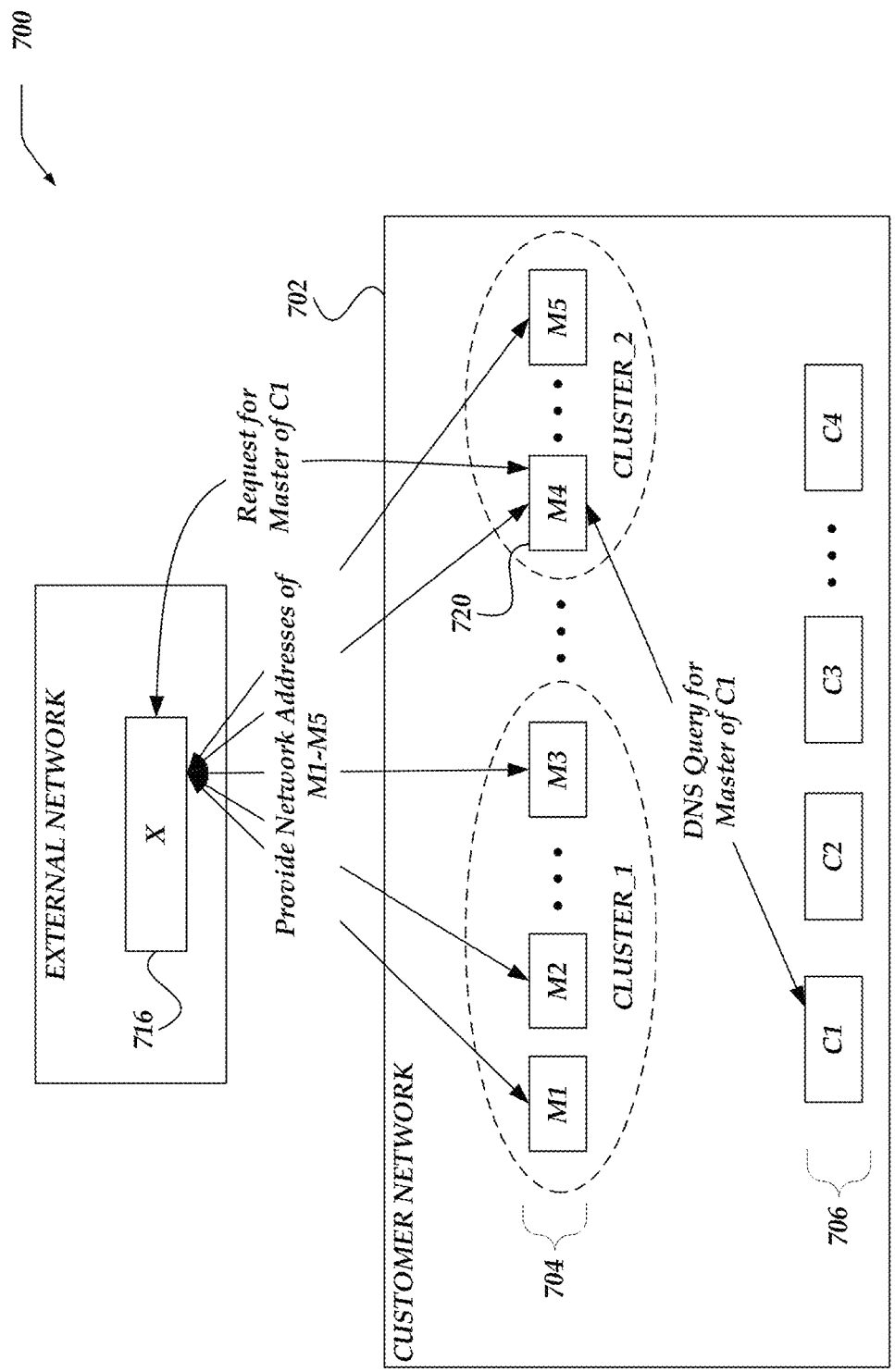
FIG. 7 shows an illustrative embodiment of a system for configuring a distributed storage system over a customer network when the customer network supports a master computer in the distributed storage system as a DNS server.

FIGS. 5-7 show illustrative embodiments of a system for configuring a distributed storage system over a customer network based on the infrastructure and various capabilities and/or characteristics of the customer network. Subordinate computers (and/or master computers) may perform different actions (as illustrated in FIGS. 5-7) based on different capabilities of the customer network in order to determine their corresponding master computers to configure the distributed storage system. This distributed storage system configuration may be referred to as network bootstrapping for the distributed storage system.

FIG. 5 shows an illustrative embodiment of a system for configuring a distributed storage system over a customer network when the customer network supports site-level multicast.

System 500 may include a plurality of master computers 504 and a plurality of subordinate computers 506. Master computers 504 and/or subordinate computers 506 may communicate with each via customer network 502. However, it should be noted that when a subordinate computer or master computer is added to system 500 it may have to perform embodiments described herein to be configured to directly communicate with other subordinate computers and/or master computers in the system because they may not previously know the network addresses of other subordinate and/or master computers. In various embodiments, subordinate and/or master computers be a member of a cluster, such as clusters 508 and 510.

A customer network that supports site-level multicast may be a network that supports IPv6 or IPv4 multicasting or the equivalent. Site-level multicast may enable computers (subordinate computers and/or master computers) to send one message on the network to other associated computers on the network. In various embodiments, site-level multicast may include a subnet broadcast such that members of the subgroup receive the broadcast and subscribers to the subgroup can also receive the broadcast.

For example, subordinate computer C1 may be added to system 500 such that subordinate computer C1 is unaware of which master computers 504 are its master computers and which cluster it is a member of. When subordinate computer C1 is newly added to customer network 502, it may be assigned a network address. It should be recognized that a subordinate computer (or master computer) may already have a network address if it was previously configured with the customer network, but temporarily lost communication with the network (e.g., if it was shut down). But in some embodiments, it may be that the subordinate computer (or master computer) may have to acquire a new network address.

Subordinate computer C1 may send out a site-level multicast on customer network 502 to request responses from its master computers to determine its associated master computers. In this illustration, master computers M1, M2, and M3 may be the master computers of subordinate computer C1. Also illustrated is that master computers M1, M2, and M3 are in cluster 508, which C1 may also be a member of (or join as a member). In response to the multicast, these associated master computers may send a message over unicast or multicast to subordinate computer C1 with their identity/location within customer network 502 (e.g., their network address). Subordinate computer C1 can then communicate directly with each of these master computers that respond to the multicast message. In various embodiments, subordinate computer C1 may report or register its identity (e.g., its network address) with each of its master computers.

It should be recognized that for a variety of different reasons (e.g., a master computer being temporarily unavailable due to lack of resources, loss of connectivity, or the like) one of master computers M1, M2, or M3 may not respond to subordinate computer C1's multicast message (such as illustrated by no unicast or multicast response from master computer M1 to subordinate computer C1). So, subordinate computer C1 can send a message to at least one of the responding master computers (e.g., master computer M1) to request a list of other master computers that are in the same cluster. This list may include network addresses of all master computers known to be a member of that particular cluster. The subordinate computer can then report or register its identity with any master computers in the list that it had not previously registered with. In various embodiments, registering a subordinate computer with a master computer may subsequently add that subordinate computer to of be a member of the same cluster that the master computer is a member of.

Likewise, subordinate computer C1 can send a message to at least one of its master computers to request a list of other subordinate computers that are also in the same cluster. The master computer may respond with a list of network addresses of the other subordinate computers in the same cluster. For example, C2 may already be a member of cluster 508 by performing embodiments described herein. Once subordinate computer C1 has the network addresses of each of its master computers and other subordinate computers in the cluster, subordinate computer C1 can directly communicate with each of these master and subordinate computers.

This processes of utilizing site-level multicasting in the customer network is further described below in conjunction with FIGS. 8 and 9.

If customer network 502 does not support site-level multicast, then the subordinate computers may utilize a local DNS (domain name system) server to obtain the network addresses of its master computers, which is shown in FIGS. 6 and 7. In some embodiments, the subordinate computer may first try to send a site-level multicast as described in FIG. 5. But if that is unsuccessful—no master computers respond to the multicast message—then the subordinate computer may attempt to utilize a local DNS server, as illustrated in FIG. 6 (and FIG. 7).

FIG. 6 shows an illustrative embodiment of a system for configuring a distributed storage system over a customer network when the customer network supports a local customer DNS server. System 600 may include a plurality of master computers 604 and a plurality of subordinate computers 606. Master computers 604 and subordinate computers 606 may be embodiments of master computers 504 and subordinate computers 506 of FIG. 5, respectively. Master computers 604 and/or subordinate computers 606 may communicate with each other via customer network 602 Customer network 602 may be an embodiment of customer network 502 in FIG. 5, but that it does not support site-level multicast.

When a master computer is added to customer network 602, it may be assigned a network address. Each master computer may provide its network address to external server 616. External server 616 may be a server on external network 614 that is separate from customer network 602. Although external server 616 is illustrated as being on a separate network, embodiments are no so limited and it may be on the customer network but not directly accessible by the subordinate computers. In some embodiments, external server 616 may coordinate or manage the clusters of computers in customer network 602. For example, external server 616 may maintain a database or other suitable data structure of each master computer, their associated subordinate computers, and other associated master computers in customer network 602. So, external serer 616 may maintain a current representation of each member of each cluster in customer network 602. In other embodiments, external server 616 may maintain a database or other suitable data structure of each cluster of master computers without knowing of subordinate computers.

When a subordinate computer is added to customer network 602, it may be assigned a network address. Subordinate computer C1 may locate DNS server 618 through an auto-configuration procedure when connected to customer network 602. Subordinate computer C1 may send a DNS query to DNS server 618 to obtain its master computers. In some embodiments, the DNS query may include an identifier of the subordinate computer, but may not include a name of its master computer(s) (because the subordinate computer is unaware of who its masters are). An example DNS query may be "C1.master.iggy.bz". So, rather than query the DNS server for an address of a specific master computer, the query is for addresses of master computers of a particular subordinate computer.

DNS server 618 may be configured to forward the DNS query to external server 616. Based on the DNS query, external server 616 may perform a lookup or other process to determine one or more master computers of subordinate computer C1. In some embodiments, external server 616 may perform various operations to determine which cluster (or which master computers are associated with the subordinate computer). For example, the external server may determine which cluster to add the subordinate computer to based on current characteristics of the clusters and their need for additional subordinate computers.

Once a cluster/master computers are determined for the subordinate computer, the external server may respond to the DNS server with addresses of the determined master computers. In one illustrative example, external server 616 may respond to the DNS query with network addresses for master computers M1, M2, and M3. DNS server 616 may then forward these addresses to subordinate computer C1.

Subordinate computer C1 can then communicate directly with these master computers, and may query the master computers for the network addresses of other subordinate computers in the same cluster, as described herein.

This processes of utilizing a local customer supported DNS server is further described below in conjunction with FIGS. 8 and 10.

If the customer network does not have a designated DNS server, then one of the master computers may be configured as a DNS server to communicate DNS queries with the external server, as illustrated in FIG. 7.

FIG. 7 shows an illustrative embodiment of a system for configuring a distributed storage system over a customer network when the customer network supports a master computer in the distributed storage system as a DNS server. System 700 may be an embodiment of system 600 of FIG. 6. Master computers 704 and subordinate computers 706 may be embodiments of master computers 604 and subordinate computers 606 of FIG. 6, respectively. Master computers 704 and/or subordinate computers 706 may communicate with each via customer network 702. Customer network 702 may be an embodiment of customer network 602 in FIG. 6, but that it does not have a dedicated DNS server. Briefly, subordinate computer may obtain the network addresses of its master computers similar to what is described above in FIG. 6, but that it may utilize a master computer DNS server, rather than a customer provided DNS server.

A network administrator may configure one of master computers 704 to be a DNS server that can be queried by subordinate computers 706. As illustrated, master computer 720 may be configured as the DNS server. So, when a subordinate computer is added to customer network 702, it may be assigned a network address. Subordinate computer C1 may locate master computer DNS server 720 through an auto-configuration procedure when added to customer network 702 (or when the master computer DNS server is initiated).

Subordinate computer C1 may send a DNS query to master computer DNS server 720 to obtain network addresses of its master computers, which may be accomplished similar to subordinate computer C1 querying DNS server 618 in FIG. 6. If the master computers for subordinate computer C1 are in the same cluster as the master computer DNS server, then the master computer DNS server may respond to subordinate computer C1 with a list of its master computers—without accessing external server 716. Otherwise, the master computer DNS server may forward the DNS query to external server 716. External server 716 may be an embodiment of external server 616 of FIG. 6. Based on the DNS query, external server 716 may perform a lookup or other process to determine one or more master computers of subordinate computer C1. In one illustrative example, external server 716 may respond to the DNS query with network addresses for master computers M1, M2, and M3. Subordinate computer C1 can then communicate directly with these master computers, and may query the master computers for the network addresses of other subordinate computers in the same cluster.

This processes of utilizing a local customer supported DNS server is further described below in conjunction with FIGS. 8 and 11.

Although the examples described above in conjunction with FIGS. 5-7 are described from the perspective of subordinate computer C1, each subordinate computer may employ the same embodiments to determine who their associated master computers are and to obtain their network addresses. Similarly, master computers can perform the same embodiments to determine other master computers that are in the same cluster. By employing embodiments described herein, the amount of manual configuration performed by a network administrator may be reduced while also reducing the number of requests to an external service/network.

General Operation

The operation of certain aspects of the invention will now be described with respect to FIGS. 8-11. In at least one of various embodiments, processes 800, 900, 1000, or 1100 of FIGS. 8-11, respectively, may be implemented by and/or executed on one or more computers, such as network computer 200 of FIG. 2 or other network devices. Additionally, various embodiments described herein can be implemented in a system such as system 100 of FIG. 1.

Figure 8:
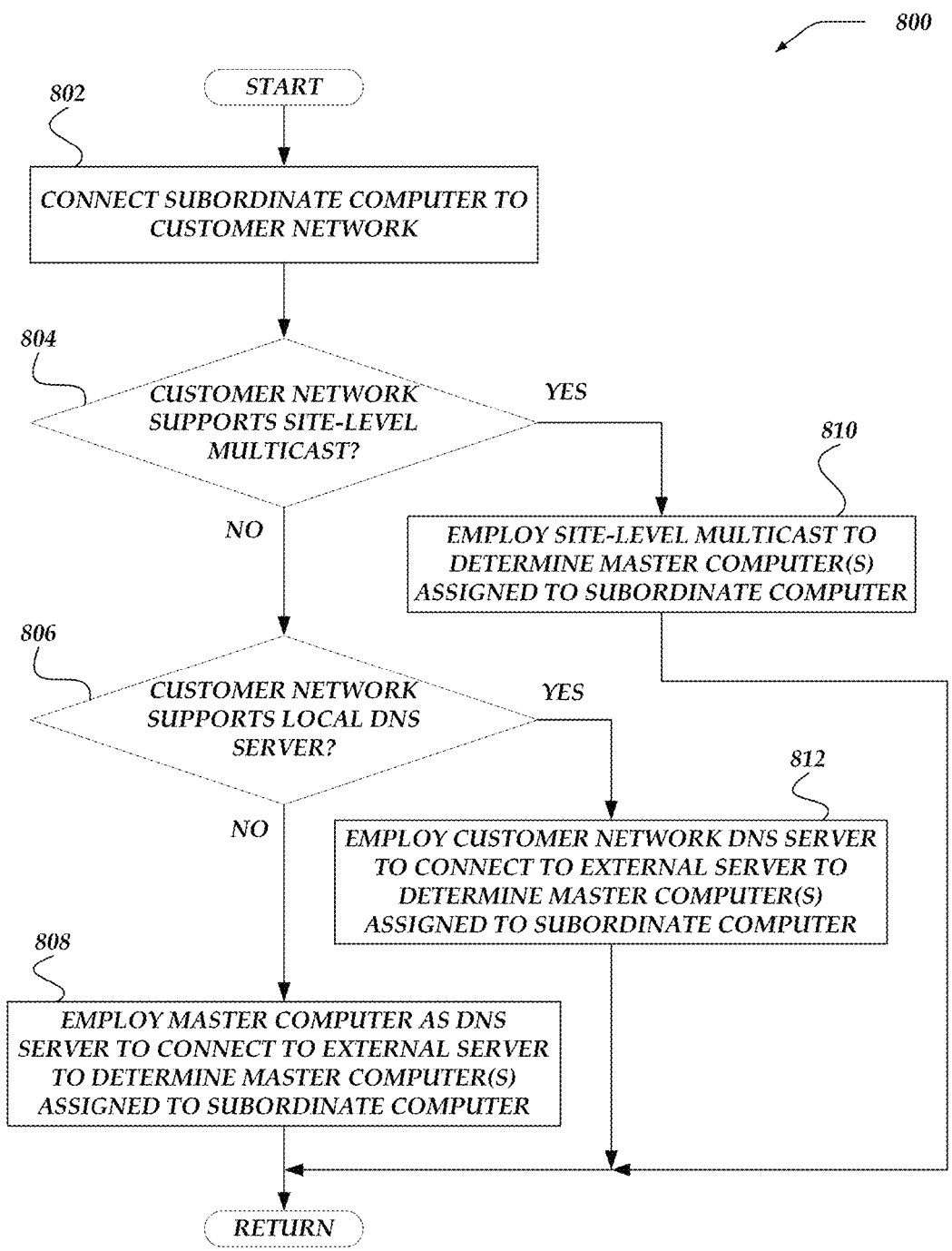
FIG. 8 illustrates a logical flow diagram generally showing one embodiment of an overview process for configuring a distributed storage system over a customer network.

FIG. 8 illustrates a logical flow diagram generally showing one embodiment of an overview process for configuring a distributed storage system over a customer network. Process 800 may begin, after a start block, at block 802, where a subordinate computer of a distributed storage system may be connected or otherwise added to a customer network. As described herein, adding a subordinate computer to a customer network can include a variety of scenarios where the subordinate computer is new to the customer network and attempts to determine which master computers are its associated master computers (e.g., which cluster is the subordinate computer a member of) and to obtain their network addresses.

Process 800 may proceed to decision block 804, where a determination may be made whether the customer network supports site-level multicast. In some embodiments, this determination may be based on the infrastructure, parameters, and/or characteristics of the customer network. For example, the customer network may support site-level multicast if it is configured to support IPv6. In other embodiments, it may be automatically assumed that the customer network supports site-level multicast. If the customer network supports site-level multicast, then process 800 may flow to block 810; otherwise process 800 may flow to block 806.

Figure 9:
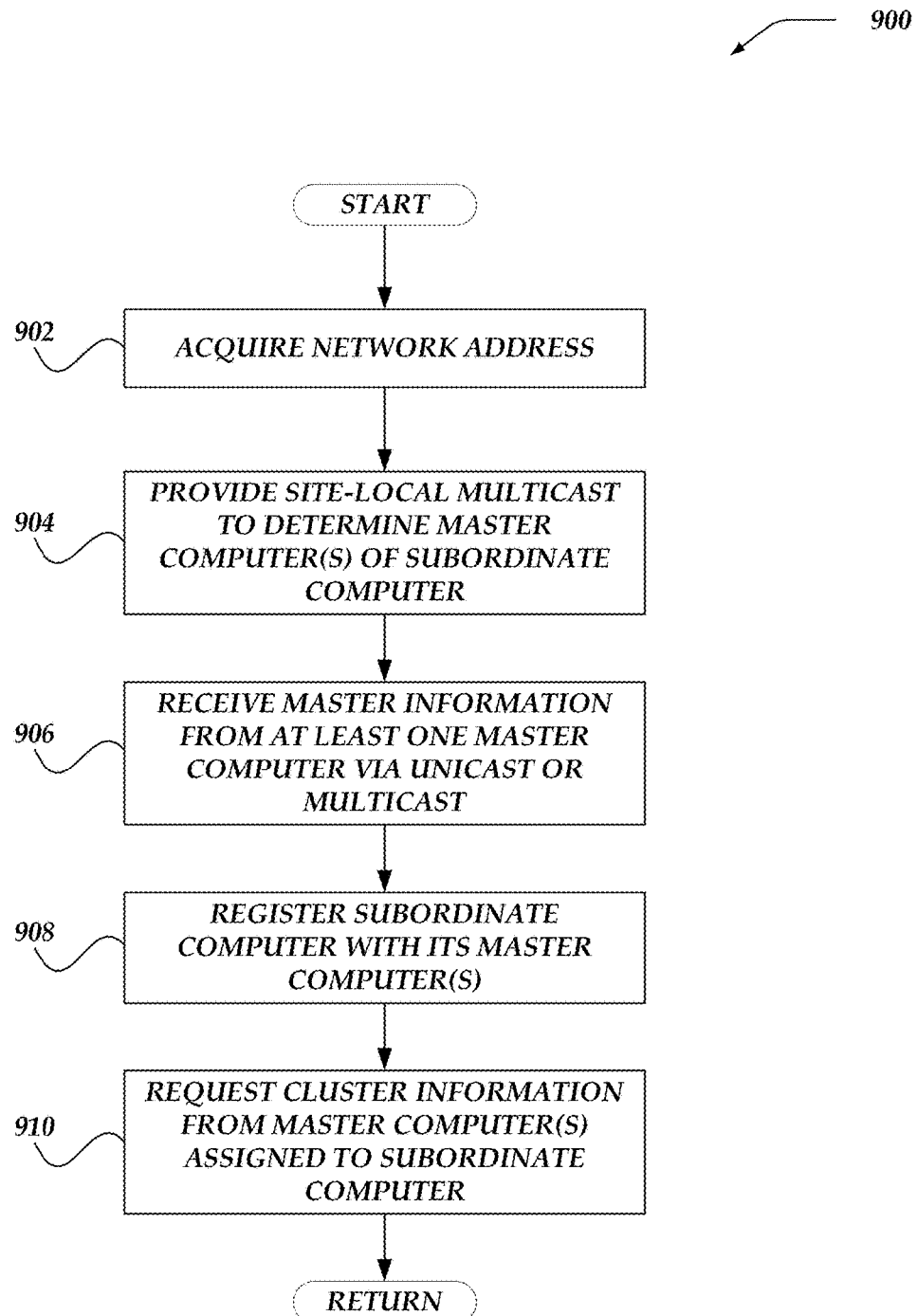
FIG. 9 illustrates a logical flow diagram generally showing one embodiment of a process for configuring a distributed storage system when the customer network supports site-level multicast.

At block 810, the subordinate computer may employ site-level multicast to determine its master computers (or the master computers assigned to the subordinate computer), which is described in more detail in conjunction with FIGS. 5 and 9. After block 810, process 800 may terminate and/or return to a calling process to perform other actions.

If it is assumed (at decision block 804) that the customer network supports site-level multicast and the subordinate computer does not receive any responses to a site-level multicast, then process 800 may flow (not illustrated) from block 810 to decision block 806 to employ another mechanism to determine its master computer(s).

If, at decision block 804, the customer network does not support site-level multicast, then process 800 may flow from decision block 804 to decision block 806. At decision block 806, a determination may be made whether the customer network supports a local customer supported/supplied DNS server. In various embodiments, a network administrator may configure a local DNS server for the customer network. In at least one embodiment, this DNS server may be referred to as a customer supplied DNS server that is local to the customer network. If the customer network has a local DNS server, then process 800 may flow to block 812; otherwise process 800 may flow to block 808.

Figure 10:
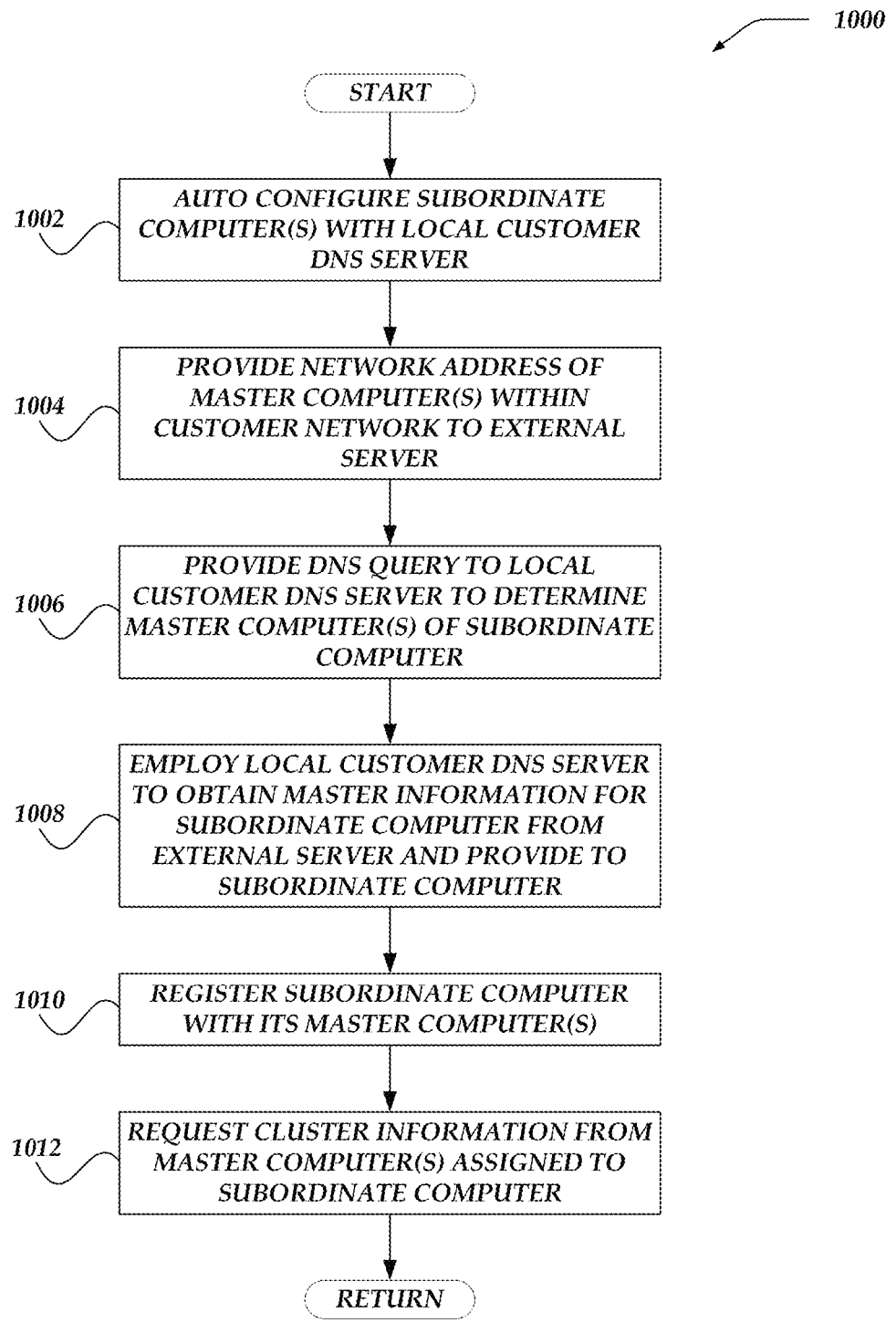
FIG. 10 illustrates a logical flow diagram generally showing one embodiment of a process for configuring a distributed storage system when the customer network supports a local customer DNS server.

At block 812, the subordinate computer may utilize the customer network DNS server to connect to an external server to determine its master computers (or the master computers assigned to the subordinate computer), which is described in more detail in conjunction with FIGS. 4 and 10. After block 812, process 800 may terminate and/or return to a calling process to perform other actions.

If, at decision block 806, the customer network does not support a local DNS server, then process 800 may flow from decision block 806 to block 808. At block 808, a master computer may be designated as a DNS server, such that the subordinate computer may utilize the master computer DNS server to connect to the external server to determine its master computers (or the master computers assigned to the subordinate computer), similar to utilizing the customer network DNS server described at block 812, which is described in more detail in conjunction with FIGS. 7 and 11. After block 808, process 800 may terminate and/or return to a calling process to perform other actions.

Although process 800 is described from the perspective of a single subordinate computer (i.e., the subordinate computer being connected/added to the customer network), each subordinate computer connected/added to the customer network may separately perform process 800 to determine who their associated or assigned master computers are. Similarly, master computers can perform process 800 to determine other master computers that are the same cluster.

It should be noted that process 800 may be performed periodically, at predetermined times, each time a subordinate computer or master computer is added to the network (e.g., becomes connected to the network whether from being physically connected to the network, turned on, rebooted, or the like), or the like.

FIG. 9 illustrates a logical flow diagram generally showing one embodiment of a process for configuring a distributed storage system when the customer network supports site-level multicast. In various embodiments, each subordinate computer (and/or master computer) may perform embodiments of process 900 when added/connected to a customer network and the customer network supports site-level multicast.

Process 900 may begin, after a start block, at block 902, where a network address may be acquired. In various embodiments, the subordinate computer may be assigned a network address when added to the customer network based on auto-configuration parameters of the network.

Process 900 may proceed to block 904, where the subordinate computer may provide a site-level multicast to the customer network. In various embodiments, the site-level multicast may be a single message requesting responses from master computers that are known to be master computers of the subordinate computer.

Process 900 may continue at block 906, where the subordinate computer may receive master computer information from at least one associated master computer. In various embodiments, a master computer may respond to the multicast message by sending its network address to the subordinate computer via a unicast or multicast message. In at least one embodiment, the master computers that respond to the multicast may be referred to as the master computers of the subordinate computer. Likewise, other master computers in a same cluster may also be referred to as master computers of the subordinate computers in the same cluster.

As described above, it may be assumed that the customer network supports site-level multicast. However, if it does not support site-level multicast then no master computers may respond to the multicast. Even if the network supports site-level multicast, it may be possible for a master computer of the subordinate computer to miss the multicast or fail to respond to the multicast. In both cases the subordinate computer may not receive a response to its multicast. In such an scenario, process 900 may terminate and the subordinate computer may attempt to determine its master computers via a different mechanism as described herein (e.g., employing a customer network DNS server (as described in conjunction with FIG. 10) and/or employing a master computer DNS server (as described in conjunction with FIG. 11).

Process 900 may proceed next to block 908, where the subordinate computer may register itself with the master computers that respond to the multicast message. In various embodiments, registering a subordinate computer with a master computer may include the subordinate computer instructing the master computer to add the subordinate computer to the cluster associated with that master computer. In some embodiments, block 908 may be optional if the master computers register the subordinate computer based on the multicast.

Process 900 may continue at block 910, where the subordinate computer may request additional cluster information from at least one of its master computers. In some embodiments, this request may accompany the request to register the subordinate computer with the master computer. In at least one of various embodiments, the subordinate computer may request the network addresses of other master computers in the cluster or other subordinate computers in the cluster—that are known to the master computer. In some embodiments, the subordinate computer may send this request to each of its master computers. In other embodiments, each master computer in a cluster may harmonize and reconcile the master computers and/or subordinate computers currently in the cluster so that the subordinate computer may send this request to only one of its master computers.

In some embodiments, if the master computer responds with information for other master computers in the same cluster as the subordinate computer, then the subordinate computer may register with those other master computers (similar to what is described at block 908). In other embodiments, the subordinate computer may not register with the other master computers if the master computers in a cluster harmonize and reconcile their lists of current subordinate computers in the same cluster.

After block 910, process 900 may terminate and/or return to another process to perform other actions.

FIG. 10 illustrates a logical flow diagram generally showing one embodiment of a process for configuring a distributed storage system when the customer network supports a local customer DNS server. As described herein, each subordinate computer (and/or master computer) may perform embodiments of process 1000 when added/connected to a customer network, the customer network does not supports site-level multicast (or no master computers responded to a multicast message), and the customer network supports a local DNS server.

Process 1000 may begin, after a start block, at block 1002, where subordinate computers may be automatically configured with a local customer DNS server. In various embodiments, the subordinate computer may be assigned a network address and a DNS server when added to the customer network based on auto-configuration parameters of the network.

Process 1000 may proceed to block 1004, where each master computer may provide its network address to an external server. In some embodiments, the external server may be authoritative name server accessed by the local customer DNS server to obtain responses to the DNS queries (e.g., queries for master computers of subordinate computers). In some embodiments, a master computer may provide its network address directly to the external server. In other embodiments, the master computer may be able to utilize a DNS query and the customer DNS server to notify the external server of its network address.

Process 1000 may continue at block 1006, where a subordinate computer may provide a DNS query to the local customer DNS server to determine the master computers of the subordinate computer and obtain their network addresses. In various embodiments, the query may identify the external server and include a request for the master computers of the subordinate computer. So, unlike a traditional DNS query that requests an address of a particular computer, this query does not include a particular computer (i.e., master computers) that it is requesting. In general, the DNS query sent from the subordinate computer is asking "who is my master computer(s)?" An example query may be "C1.master.iggy.bz", which may be querying the DNS server to ask the external server for network addresses of the master computers of subordinate computer "C1."

As described herein, in some embodiments a master computer may employ this process to determine other master computers in a same cluster. In this embodiment, the master computer may provide the DNS query to the local customer DNS server but asking "who are the other master computer(s) in my cluster?" An example query may be "M1.master.iggy.bz", which may be querying the DNS server to ask the external server for network addresses of the other master computers that share a same cluster as master computer "M1."

Process 1000 may proceed next to block 1008, where the local customer DNS server may obtain master computer information from the external server. The external server may perform as an authoritative name server that fulfills or responds to the DNS query. In various embodiments, the external server may maintain a database or other data structure of each master computer and the cluster that they are associated with. The external server may then provide the results (i.e., network addresses of each master computer of the requesting subordinate computer) to the DNS query back to the local customer DNS server, which may in turn provide the results to the subordinate computer that provided the DNS query.

Process 1000 may continue next at block 1010, where the subordinate computer may register with its master computers based on the results from the DNS query. In various embodiments, block 1010 may employ embodiments of block 908 of FIG. 9, where the subordinate computer may register with each of its master computers. In some embodiments, the subordinate computer may send a message with its identity to each of its master computers. The master computers may then register to subordinate computer in a list of its subordinate computers. In some other embodiments, the subordinate computer may send a message with its identity to one of its master computers, and the master computer may share the subordinate computer's registration information with other associated master computers.

Process 1000 may proceed to block 1012, where the subordinate computer may request additional cluster information from at least one of its master computers. In various embodiments, block 1012 may employ embodiments of block 910 of FIG. 9 to request additional information (e.g., other subordinate computers or master computers in the same cluster as the subordinate computer).

After block 1012, process 1000 may terminate and/or return to a calling process to perform other actions.

Figure 11:
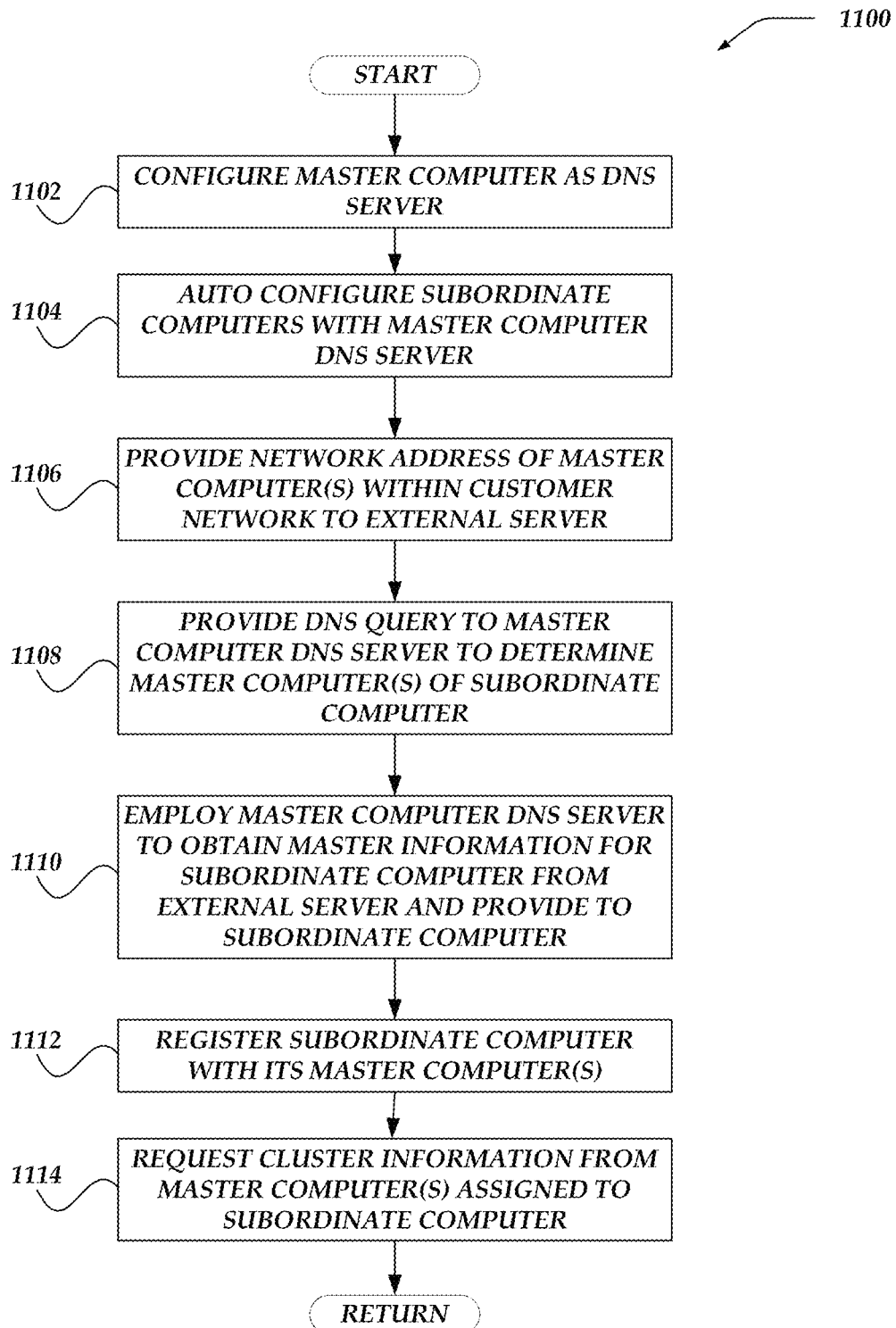
FIG. 11 illustrates a logical flow diagram generally showing one embodiment of a process for configuring a distributed storage system when the customer network supports a master computer in the distributed storage system as a DNS server.

FIG. 11 illustrates a logical flow diagram generally showing one embodiment of a process for configuring a distributed storage system when the customer network supports a master computer in the distributed storage system as a DNS server. As described herein, each subordinate computer (and/or master computer) may perform embodiments of process 1100 when added/connected to a customer network, the customer network does not supports site-level multicast (or no master computers responded to a multicast message), and the customer network does not supports a local customer DNS server.

Process 1100 may begin, after a start block, at block 1102, where a master computer may be configured as a DNS server. In at least one of various embodiments, a network administrator may be enabled to configure at least one of the master to computers to be a DNS server for purposes of subordinate computers determining their master computers. In some embodiments, a master computer may automatically configure itself as a DNS server if the network does not support site-level multicast and/or if the customer network does not include a local DNS server.

Process 1100 may proceed to block 1104, where subordinate computers may be automatically configured with the master computer DNS server. In various embodiments, the subordinate computer may be assigned a network address and be notified of the master computer DNS server when added to the customer network based on auto-configuration parameters of the network.

Process 1100 may continue at block 1106, where each master computer may provide its network address to an external server. In various embodiments, block 1106 may employ embodiments of block 1004 of FIG. 10 to update the external computers with the network addresses of the master computer(s).

Process 1100 may proceed next to block 1108, where a subordinate computer may provide a DNS query to the master computer DNS server to determine the master computers of the subordinate computer. In various embodiments, block 1108 may employ embodiments of block 1006 of FIG. 10 to provide a DNS query, but with the master computer DNS server rather than a local customer DNS server.

Process 1100 may continue next at block 1110, where the master computer DNS server may obtain master computer information from the external server. In various embodiments, block 1110 may employ embodiments of block 1008 of FIG. 10, but where the DNS server is a master computer rather than a customer provided DNS server.

In at least one of various embodiments, if the master computer DNS server is a master computer of the subordinate computer that provided the DNS query (or is in the same cluster as other master computers of the subordinate computer), then the master computer DNS server may directly respond to the DNS query without accessing the external server. This action may be possible because the master computer DNS server already has the master computer information for the requesting subordinate computer, which can reduce the number of requests sent to the external server.

Process 1100 may proceed to block 1112, where the subordinate computer may register with its master computers based on the results from the DNS query. In various embodiments, block 1112 may employ embodiments of block 1010 of FIG. 10 to register the subordinate computer with its master computers. In some embodiments, if the master computer DNS server is a master computer of the subordinate computer, then it may register the subordinate computer based on the DNS query. In at least one such embodiment, the master computer DNS server may notify other master computers in its cluster of the subordinate computer or the subordinate computer may individually register with each of its other master computers based on the response from the DNS query.

Process 1100 may continue at block 1114, where the subordinate computer may request additional cluster information from at least one of its master computers. In various embodiments, block 1114 may employ embodiments of block 1012 of FIG. 10.

After block 1114, process 1100 may terminate and/or return to a calling process to perform other actions.

It should be recognized that various combinations of embodiments described herein may be employed so long a modified shingle includes a different composition of storage devices than a pre-modified shingle. For example, one shingle modification may be based on an ordering of storage devices in the group and/or shingle, and another shingle modification may be based on other criteria of storage system and/or shingles (e.g., shingle capacity).

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for a distributed storage system on a network, comprising:
   establishing communication between a plurality of separate controllers over the network, wherein each controller is coupled to a storage device and each controller is identified as one of a master computer or a subordinate computer, and wherein each subordinate computer is assigned to one or more master computers;
   when the network provides for site-level multicasting and a controller is identified as the subordinate computer, broadcasting site-level multicast requests for a network address of one or more master computers assigned to that subordinate computer;
   when the network supports a local domain name system (DNS) server, providing a DNS query to the local DNS server to obtain the network address for the one or more master computers assigned to the subordinate computer; and
   when the network supports a master computer as a DNS server, providing the DNS query to the master computer DNS server to obtain the network address and identify the one or more master computers assigned to the subordinate computer, wherein one of the identified master computers notifies each other identified master computer in its cluster of the subordinate computer or the subordinate computer registers itself with each identified master computer assigned to the subordinate computer based on a response from the DNS query.

2. The method of claim 1, further comprising, employing one subordinate computer to provide a request to one of the master computers assigned to the one subordinate computer to determine other subordinate computers associated with the one subordinate computer.

3. The method of claim 1, further comprising, configuring one of the master computers as a DNS server to communicate DNS requests to an external server.

4. The method of claim 1, wherein each of the master computers provides its network address to an external server to enable the external server to provide master computer network addresses to the subordinate computer based on the query.

5. The method of claim 1, further comprising:
   when the network provides for site-level multicasting, employing a master computer to broadcast site-level multicast requests for a network address of one or more other master computers assigned to a same cluster as that master computer;
   when the network supports a local domain name system (DNS) server, employing one master computer to provide a DNS query to the local DNS server to obtain from an external server the network address for the one or more other master computers assigned to the same cluster as the one master computer; or
   when the network supports one master computer as a DNS server, employing that master computer, providing the DNS query to the master computer DNS server to obtain from the external server the network address of the one or more other master computers assigned to the same cluster as that master computer.

6. A controller for a distributed storage system over a network, comprising:
   an interface that is coupled to one or more storage devices;
   an interface for communicating over the network with at least a plurality of controllers; and
   one or more processors that execute instructions to perform actions, including:
      establishing communication with the plurality of controllers over the network, wherein each controller is identified as one of a master computer or a subordinate computer, and wherein each subordinate computer is assigned to one or more master computers;
      when the network provides for site-level multicasting and a controller is identified as the subordinate computer, broadcasting site-level multicast requests for a network address of one or more master computers assigned to that subordinate computer;

when the network supports a local domain name system (DNS) server, providing a DNS query to the local DNS server to obtain the network address for the one or more master computers assigned to the subordinate computer; and when the network supports a master computer as a DNS server, providing the DNS query to the master computer DNS server to obtain the network address and identify the one or more master computers assigned to the subordinate computer, wherein one of the identified master computers notifies each other identified master computer in its cluster of the subordinate computer or the subordinate computer registers itself with each identified master computer assigned to the subordinate computer based on a response from the DNS query.

7. The controller of claim 6, further comprising, employing one subordinate computer to provide a request to one of the master computers assigned to the one subordinate computer to determine other subordinate computers associated with the one subordinate computer.

8. The controller of claim 6, further comprising, configuring one of the master computers as a DNS server to communicate DNS requests to an external server.

9. The controller of claim 6, wherein each of the master computers provides its network address to an external server to enable the external server to provide master computer network addresses to the subordinate computer based on the query.

10. The controller of claim 6, further comprising:
when the network provides for site-level multicasting, employing a master computer to broadcast site-level multicast requests for a network address of one or more other master computers assigned to a same cluster as that master computer;
when the network supports a local domain name system (DNS) server, employing one master computer to provide a DNS query to the local DNS server to obtain from an external server the network address for the one or more other master computers assigned to the same cluster as the one master computer; or
when the network supports one master computer as a DNS server, employing that master computer, providing the DNS query to the master computer DNS server to obtain from the external server the network address of the one or more other master computers assigned to the same cluster as that master computer.

11. A system for a distributed storage system over a network, comprising:
a plurality of controllers, comprising:
an interface that is coupled to one or more storage devices;
another interface for communicating over the network; and
one or more processors that execute instructions to perform actions, including:
establishing communication between the plurality of controllers over the network, wherein each controller is identified as one of a master computer or a subordinate computer, and wherein each subordinate computer is assigned to one or more master computers;
when the network provides for site-level multicasting and a controller is identified as the subordinate computer, broadcasting site-level multicast requests for a network address of one or more master computers assigned to that subordinate computer;
when the network supports a local domain name system (DNS) server, providing a DNS query to the local DNS server to obtain the network address for the one or more master computers assigned to the subordinate computer; and
when the network supports a master computer as a DNS server, providing the DNS query to the master computer DNS server to obtain the network address and identify the one or more master computers assigned to the subordinate computer, wherein one of the identified master computers notifies each other identified master computer in its cluster of the subordinate computer or the subordinate computer registers itself with each identified master computer assigned to the subordinate computer based on a response from the DNS query.

12. The system of claim 11, further comprising, employing one subordinate computer to provide a request to one of the master computers assigned to the one subordinate computer to determine other subordinate computers associated with the one subordinate computer.

13. The system of claim 11, further comprising, configuring one of the master computers as a DNS server to communicate DNS requests to an external server.

14. The system of claim 11, wherein each of the master computers provides its network address to an external server to enable the external server to provide master computer network addresses to the subordinate computer based on the query.

15. The system of claim 11, further comprising:
when the network provides for site-level multicasting, employing a master computer to broadcast site-level multicast requests for a network address of one or more other master computers assigned to a same cluster as that master computer;
when the network supports a local domain name system (DNS) server, employing one master computer to provide a DNS query to the local DNS server to obtain from an external server the network address for the one or more other master computers assigned to the same cluster as the one master computer; or
when the network supports one master computer as a DNS server, employing that master computer, providing the DNS query to the master computer DNS server to obtain from the external server the network address of the one or more other master computers assigned to the same cluster as that master computer.

16. A processor readable non-transitory storage media that includes instructions for managing a distributed storage system over a network, wherein execution of the instructions by one or more processors performs actions, comprising:
establishing communication between a plurality of separate controllers over the network, wherein each controller is coupled to a storage device and each controller is identified as one of a master computer or a subordinate computer, and wherein each subordinate computer is assigned to one or more master computers;
when the network provides for site-level multicasting and a controller is identified as the subordinate computer, broadcasting site-level multicast requests for a network address of one or more master computers assigned to that subordinate computer;

when the network supports a local domain name system (DNS) server, providing a DNS query to the local DNS server to obtain the network address for the one or more master computers assigned to the subordinate computer; and when the network supports a master computer as a DNS server, providing the DNS query to the master computer DNS server to obtain the network address and identify the one or more master computers assigned to the subordinate computer, wherein one of the identified master computers notifies each other identified master computer in its cluster of the subordinate computer or the subordinate computer registers itself with each identified master computer assigned to the subordinate computer based on a response from the DNS query.

17. The media of claim 16, further comprising, employing one subordinate computer to provide a request to one of the master computers assigned to the one subordinate computer to determine other subordinate computers associated with the one subordinate computer.

18. The media of claim 16, further comprising, configuring one of the master computers as a DNS server to communicate DNS requests to an external server.

19. The media of claim 16, wherein each of the master computers provides its network address to an external server to enable the external server to provide master computer network addresses to the subordinate computer based on the query.

20. The media of claim 16, further comprising:

when the network provides for site-level multicasting, employing a master computer to broadcast site-level multicast requests for a network address of one or more other master computers assigned to a same cluster as that master computer;

when the network supports a local domain name system (DNS) server, employing one master computer to provide a DNS query to the local DNS server to obtain from an external server the network address for the one or more other master computers assigned to the same cluster as the one master computer; or when the network supports one master computer as a DNS server, employing that master computer, providing the DNS query to the master computer DNS server to obtain from the external server the network address of the one or more other master computers assigned to the same cluster as that master computer.

* * * * *

UNITED STATES PATENT AND TRADEMARK OFFICE
CERTIFICATE OF CORRECTION

PATENT NO.        : 9,531,585 B2
APPLICATION NO.   : 15/056773
DATED             : December 27, 2016
INVENTOR(S)       : Daud et al.

It is certified that error appears in the above-identified patent and that said Letters Patent is hereby corrected as shown below:

On the Title Page

Item (57), under "ABSTRACT", in Column 2, Line 14, delete "When then" and insert -- When the --, therefor.

In the Drawings

In Fig. 9, Sheet 9 of 11, in Block "904", Line 1, delete "SITE-LOCAL" and insert -- SITE-LEVEL --, therefor.

In Fig. 11, Sheet 11 of 11, in Block "1110", Line 2, delete "MASTER" and insert -- MASTER COMPUTER --, therefor.

In the Specification

In Column 2, Line 60, delete "tem" and insert -- term --, therefor.

In Column 3, Line 39, delete "limited to" and insert -- limited to, --, therefor.

In Column 4, Line 63, delete "when then" and insert -- when the --, therefor.

In Column 5, Line 28, delete "when then" and insert -- when the --, therefor.

In Column 6, Line 45, delete "Enhanced Data GSM Environment" and insert -- Enhanced Data rate for GSM Evolution --, therefor.

In Column 6, Line 60, delete "(MIMS)," and insert -- (MMS), --, therefor.

In Column 6, Line 64, delete "110," and insert -- chassis 110, --, therefor.

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,531,585 B2

In Column 9, Line 24, delete "So" and insert -- So, --, therefor.

In Column 11, Line 4, delete "limited to" and insert -- limited to, --, therefor.

In Column 11, Line 60, delete "data store" and insert -- data storage --, therefor.

In Column 11, Line 62, delete "limited to" and insert -- limited to, --, therefor.

In Column 12, Line 38, delete "(GPS) receiver 332." and insert -- (GPS) transceiver 332. --, therefor.

In Column 12, Line 59, delete "(MC)." and insert -- (NIC). --, therefor.

In Column 14, Line 10, delete "Mobile™" and insert -- Mobile™, --, therefor.

In Column 14, Line 32, delete "limited to" and insert -- limited to, --, therefor.

In Column 18, Line 12, delete "602" and insert -- 602. --, therefor.

In Column 18, Line 30, delete "serer" and insert -- server --, therefor.

In Column 18, Line 66, delete "DNS server 616" and insert -- DNS server 618 --, therefor.

In Column 19, Lines 31-32, delete "master computer 720" and insert -- master computers 704 --, therefor.

In Column 22, Line 8, delete "FIG. 11)." and insert -- FIG. 11)). --, therefor.

In Column 23, Line 22, delete "embodiments" and insert -- embodiments, --, therefor.